(12) United States Patent
Gillam et al.

(10) Patent No.: US 8,812,300 B2
(45) Date of Patent: Aug. 19, 2014

(54) IDENTIFYING RELATED NAMES

(75) Inventors: Richard T. Gillam, Chantilly, VA (US); Frankie E. Patman Maguire, Washington, DC (US); Leonard A. Shaefer, Jr., Leesburg, VA (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/240,891

(22) Filed: Sep. 22, 2011

(65) Prior Publication Data

US 2012/0016663 A1 Jan. 19, 2012

Related U.S. Application Data

(63) Continuation-in-part of application No. 12/197,119, filed on Aug. 22, 2008, now Pat. No. 8,041,560, which is a continuation of application No. 10/055,178, filed on Jan. 25, 2002, now abandoned, which is a continuation of application No. 09/275,766, filed on Mar. 25, 1999, now Pat. No. 6,963,871.

(60) Provisional application No. 60/079,233, filed on Mar. 25, 1998.

(51) Int. Cl.
*G06F 17/27* (2006.01)
*G06F 17/28* (2006.01)
*G06F 17/21* (2006.01)
*G10L 21/00* (2013.01)

(52) U.S. Cl.
USPC .......... 704/9; 704/4; 704/8; 704/10; 704/270; 704/270.1; 704/275

(58) Field of Classification Search
USPC ............. 704/10, 4, 8, 9, 270, 270.1, 275
See application file for complete search history.

(56) References Cited

U.S. PATENT DOCUMENTS

| 5,040,218 A | 8/1991 | Vitale et al. |
| 5,062,143 A | 10/1991 | Schmitt |

(Continued)

FOREIGN PATENT DOCUMENTS

WO 2005081869 9/2005

OTHER PUBLICATIONS

"An Assessment of Name Matching Algorithms." University of Newcastle Upon Tyne. Lait, A.J. and B. Randell. 1996.*

(Continued)

*Primary Examiner* — Edgar Guerra-Erazo
(74) *Attorney, Agent, or Firm* — Janaki K. Davda; Konrad, Raynes, Davda & Victor LLP

(57) ABSTRACT

Provided are techniques for identifying related names. A collection of names from different languages is stored, wherein each of the names has a native orthographic form and a romanized form. An input name is received in a known encoding scheme. An alphabet of the input name is determined based on the known encoding scheme. One or more romanized names are generated based on the query name and the determined query name alphabet. Culture-sensitive regularization rules are applied to create an additional romanized name. The one or more romanized names and the additional romanized name are matched against the romanized names in the collection of names from the different languages. Data store records that have romanized names that match the one or more romanized names or the additional romanized name are returned.

18 Claims, 17 Drawing Sheets

(56) References Cited

U.S. PATENT DOCUMENTS

| | | | |
|---|---|---|---|
| 5,212,730 A | 5/1993 | Wheatley et al. | |
| 5,258,909 A | 11/1993 | Damerau et al. | |
| 5,323,316 A | 6/1994 | Kadashevich et al. | |
| 5,333,317 A | 7/1994 | Dann | |
| 5,337,232 A | 8/1994 | Sakai et al. | |
| 5,369,726 A | 11/1994 | Kroeker et al. | |
| 5,369,727 A | 11/1994 | Nomura et al. | |
| 5,371,676 A | 12/1994 | Heemels et al. | |
| 5,375,176 A | 12/1994 | Spitz | |
| 5,377,280 A | 12/1994 | Nakayama | |
| D359,480 S | 6/1995 | Levine | |
| 5,425,110 A | 6/1995 | Spitz | |
| 5,432,948 A | 7/1995 | Davis et al. | |
| 5,434,777 A | 7/1995 | Luciw | |
| 5,440,663 A | 8/1995 | Moese et al. | |
| 5,457,770 A | 10/1995 | Miyazawa | |
| 5,477,451 A | 12/1995 | Brown et al. | |
| 5,485,373 A | 1/1996 | Davis et al. | |
| 5,490,061 A | 2/1996 | Tolin et al. | |
| 5,515,475 A | 5/1996 | Gupta et al. | |
| 5,526,463 A | 6/1996 | Gillick et al. | |
| 5,548,507 A | 8/1996 | Martino et al. | |
| 5,644,740 A | 7/1997 | Kiuchi | |
| 5,680,511 A | 10/1997 | Baker et al. | |
| 5,682,524 A | 10/1997 | Freund et al. | |
| 5,687,366 A | 11/1997 | Harvey, III et al. | |
| 5,724,481 A | 3/1998 | Garberg et al. | |
| 5,758,314 A | 5/1998 | McKenna | |
| 5,819,265 A | 10/1998 | Ravin et al. | |
| 5,832,480 A | 11/1998 | Byrd, Jr. et al. | |
| 5,835,912 A | 11/1998 | Pet | |
| 5,870,700 A | 2/1999 | Parra | |
| 5,873,111 A | 2/1999 | Edberg | |
| 5,920,852 A | 7/1999 | Graupe | |
| 5,963,940 A | 10/1999 | Liddy et al. | |
| 6,038,566 A | 3/2000 | Tsai | |
| 6,067,520 A | 5/2000 | Lee | |
| 6,073,090 A | 6/2000 | Fortune et al. | |
| 6,243,669 B1 | 6/2001 | Horiguchi et al. | |
| 6,266,642 B1 | 7/2001 | Franz et al. | |
| 6,272,464 B1 | 8/2001 | Kiraz et al. | |
| 6,298,343 B1 | 10/2001 | Chang et al. | |
| 6,311,152 B1 | 10/2001 | Bai et al. | |
| 6,314,469 B1 | 11/2001 | Tan et al. | |
| 6,496,793 B1 | 12/2002 | Veditz et al. | |
| 6,618,697 B1 | 9/2003 | Kantrowitz et al. | |
| 6,651,070 B1 | 11/2003 | Hirashima et al. | |
| 6,735,593 B1 | 5/2004 | Williams | |
| 6,757,688 B1 | 6/2004 | Leapaldt et al. | |
| 6,963,871 B1* | 11/2005 | Hermansen et al. | 1/1 |
| 7,039,172 B2* | 5/2006 | Wrobel | 379/142.04 |
| 7,107,206 B1 | 9/2006 | Uchida et al. | |
| 7,134,084 B1 | 11/2006 | Rashid et al. | |
| 7,249,013 B2 | 7/2007 | Al-Onaizan et al. | |
| 7,996,403 B2* | 8/2011 | Khasin et al. | 707/737 |
| 8,041,560 B2 | 10/2011 | Hermansen et al. | |
| 2002/0083029 A1* | 6/2002 | Chun et al. | 706/45 |
| 2002/0156902 A1 | 10/2002 | Crandall | |
| 2003/0074185 A1* | 4/2003 | Kang | 704/2 |
| 2004/0002850 A1 | 1/2004 | Shaefer, Jr. et al. | |
| 2004/0024760 A1* | 2/2004 | Toner et al. | 707/6 |
| 2004/0111475 A1 | 6/2004 | Schultz | |
| 2004/0210763 A1* | 10/2004 | Jonas | 713/193 |
| 2005/0049852 A1 | 3/2005 | Chao | |
| 2005/0084152 A1* | 4/2005 | McPeake et al. | 382/173 |
| 2005/0119875 A1* | 6/2005 | Shaefer et al. | 704/7 |
| 2005/0147947 A1 | 7/2005 | Cookson, Jr. et al. | |
| 2005/0273468 A1 | 12/2005 | Hermansen et al. | |
| 2006/0031239 A1* | 2/2006 | Koenig | 707/100 |
| 2007/0005567 A1 | 1/2007 | Hermansen et al. | |
| 2007/0005578 A1 | 1/2007 | Patman et al. | |
| 2007/0005586 A1 | 1/2007 | Shaefer, Jr. et al. | |
| 2007/0027672 A1* | 2/2007 | Decary et al. | 704/7 |
| 2007/0239705 A1* | 10/2007 | Hunt et al. | 707/5 |
| 2009/0276416 A1* | 11/2009 | Ball et al. | 707/5 |
| 2009/0326914 A1* | 12/2009 | Joy et al. | 704/3 |
| 2010/0153396 A1* | 6/2010 | Margulies et al. | 707/737 |
| 2011/0137635 A1* | 6/2011 | Chalabi et al. | 704/2 |
| 2011/0137636 A1* | 6/2011 | Srihari et al. | 704/2 |
| 2012/0016660 A1 | 1/2012 | Gillam et al. | |

OTHER PUBLICATIONS

"Soundex—can it be improved?" Computers in Genealogy vol. 6, No. 5 (Mar. 1998) © 1998, the Society of Genealogist, by Peter Christian.*

"Automatic Name Searching in Large Data Bases of International Names Soundex, Transcription", Hermansen, John Christian 1985.*

Weber et al (hereinafter Weber) "Achieving a Patient Unit Record Within Electronic Record Systems", originally published in Proceedings: Toward an Electronic Patient Record '95, pp. 126-134, Mar. 14-19, 1995.*

"Phonetic Approximator System for Surname Searching", W Williams, Original Publication Date: Dec. 1, 1989.*

"Sounding Off on Soundex" retrievable at http://cdn.information-management.com/infodirect/20031010/7525-1.html (dated Oct. 1, 2003 @ 1:00am ET and authored by John C. Hermansen).*

"Identity Management Begins with Better Systems for Handling People's Names" retrievable at http://cdn.information-management.com/specialreports/20051215/1043325-1.html (dated Dec. 15, 2005 @ 1:00am ET and authored by John C. Hermansen).*

Webster, B.M., "Surname Analysis", Research Evaluation, vol. 13, No. 1, Apr. 2004, Beech Tree Publishing, 10 Watford Close, Guildford, Surrey GU1 2EP, England, Total 8 pp.

Wolinski, F., F. Vichot, & B. Dillet, "Automatic Processing of Proper Names in Texts", European Chapter Meeting of the ACL Archive. Proceedings of the Seventh Conference on European Chapter of the Association for Computational Linguistics, 1995, Total 8 pp.

Final Office Action 1, Apr. 7, 2009, for U.S. Appl. No. 10/942,792, filed Sep. 17, 2004 by L. Shaefer et al., Total 48 pp. [57.88 (FOA1)].

Final Office Action 2, Mar. 6, 2009, for U.S. Appl. No. 11/092,991, filed Mar. 30, 2005 by L.A. Shaefer et al., Total 29 pp. [57.89 (FOA2)].

Notice of Allowance 1, Jul. 27, 2009, for U.S. Appl. No. 10/942,792, filed Sep. 17, 2004 by L. Shaefer et al., Total 36 pp. [57.88 (NOA1)].

Notice of Allowance 1, Nov. 5, 2008, for U.S. Appl. No. 11/188,979, filed Jul. 26, 2005 by J.C. Hermansen et al., Total 36 pp. [57.86 (NOA1)].

Notice of Allowance 2, Mar. 18, 2009, for U.S. Appl. No. 11/188,979, filed Jul. 26, 2005 by J.C. Hermansen et al., Total 37 pp. [57.86 (NOA2)].

Notice of Allowance 3, Jul. 15, 2009, for U.S. Appl. No. 11/188,979, filed Jul. 26, 2005 by J.C. Hermansen et al., Total 6 pp. [57.86 (NOA3)].

Notice of Allowance 4, Mar. 3, 2009, for U.S. Appl. No. 10/055,178, filed Jan. 25, 2002 by J.C. Hermansen, Total 10 pp. [57.93 (NOA4)].

Notice of Allowance 5, Jul. 16, 2009, for U.S. Appl. No. 10/055,178, filed Jan. 25, 2002 by J.C. Hermansen, Total 7 pp. [57.93 (NOA5)].

US Patent Application for U.S. Appl. No. 13/240,939, filed Sep. 22, 2011, entitled "Parsing Culturally Diverse Names", invented by R.T. Gillam, F.E. Patman Maguire, and L.A. Shaffer, Jr., Total 105 pp. [57.93CIP2 (Appln)].

Amendment 1, Sep. 12, 2008, for U.S. Appl. No. 11/188,979, filed Jul. 26, 2005 by J.C. Hermansen et al., Total 16 pp. [57.86 (Amendl)].

Amendment 2, Feb. 5, 2009, for U.S. Appl. No. 11/188,979, filed Jul. 26, 2005 by J.C. Hermansen et al., Total 14 pp. [57.86 (Amend2)].

Notice of Non-Compliant Amendment, Jun. 9, 2006, for U.S. Appl. No. 11/188,979, filed Jul. 26, 2005 by J.C. Hermansen et al., Total 2 pp. [57.86 (NNCA)].

Response to Notice of Non-Compliant Amendment, Jul. 6, 2006, for U.S. Appl. No. 11/188,979, filed Jul. 26, 2005 by J.C. Hermansen et al., Total 5 pp. [57.86 (RNNCA)].

Preliminary Amendment 1, Jul. 26, 2005, for U.S. Appl. No. 11/188,979, filed Jul. 26, 2005 by J.C. Hermansen et al., Total 14 pp. [57.86 (PrelimAmend1)].

Preliminary Amendment 1, Sep. 16, 2004, for U.S. Appl. No. 10/096,828, filed on Mar. 14, 2002 by L.A. Shaefer et al., Total 14 pp. [57.87 (PrelimAmend1)].

(56) References Cited

OTHER PUBLICATIONS

Preliminary Amendment 1, Jan. 25, 2002, for U.S. Appl. No. 10/055,178, filed Jan. 25, 2002 by J.C. Hermansen, Total 44 pp. [57.93 (PrelimAmend1)].
Amendment 1, Dec. 12, 2005, for U.S. Appl. No. 10/096,828, filed Mar. 14, 2002 by L.A. Shaefer et al., Total 19 pp. [57.87 (Amendl)].
Amendment 2, May 26, 2006, for U.S. Appl. No. 10/096,828, filed Mar. 14, 2002 by L.A. Shaefer et al., Total 20 pp. [57.87 (Amend2)].
Advisory Action 1, Jul. 10, 2006, for U.S. Appl. No. 10/096,828, filed Mar. 14, 2002 by L.A. Shaefer et al., Total 3 pp. [57.87 (AdvAct1)].
Amendment 3, Mar. 20, 2007, for U.S. Appl. No. 10/096,828, filed Mar. 14, 2002 by L.A. Shaefer et al., Total 19 pp. [57.87 (Amend3)].
Response to Notice of Non-Compliant Amendment, Feb. 19, 2008, for U.S. Appl. No. 10/096,828, filed Mar. 14, 2002 by L.A. Shaefer et al., Total 15 pp. [57.87 (RNNCA)].
Amendment 1, Jan. 8, 2009, for U.S. Appl. No. 10/942,792, filed Sep. 17, 2004 by L.Shaefer et al., Total 27 pp. [57.88 (Amend1)].
Amendment 2, Jun. 29, 2009, for U.S. Appl. No. 10/942,792, filed Sep. 17, 2004 by L.Shaefer et al., Total 22 pp. [57.88 (Amend2)].
Supplemental Notice of Allowance 1, Aug. 26, 2009, for U.S. Appl. No. 10/942,792, filed Sep. 17, 2004 by L.Shaefer et al., Total 1 p. [57.88 (SuppNOA1)].
Amendment 1, Nov. 19, 2007, for U.S. Appl. No. 11/092,991, filed Mar. 30, 2005 by L.A. Shaefer et al., Total 11 pp. [57.89 (Amend1)].
Amendment 2, Apr. 29, 2008, for U.S. Appl. No. 11/092,991, filed Mar. 30, 2005 by L.A. Shaefer et al., Total 12 pp. [57.89 (Amend2)].
Amendment 3, Dec. 2, 2008, for U.S. Appl. No. 11/092,991, filed Mar. 30, 2005 by L.A. Shaefer et al., Total 15 pp. [57.89 (Amend3)].
Amendment 4, Jun. 8, 2009, for U.S. Appl. No. 11/092,991, filed Mar. 30, 2005 by L.A. Shaefer et al., Total 11 pp. [57.89 (Amend4)].
Amendment 1, Oct. 23, 2001, for U.S. Appl. No. 09/275,766, filed Mar. 25, 1999 by J.C. Hermansen, Total 8 pp. [57.92 (Amend1)].
Amendment 2, Apr. 17, 2002, for U.S. Appl. No. 09/275,766, filed Mar. 25, 1999 by J.C. Hermansen, Total 16 pp. [57.92 (Amend2)].
Amendment 3, Oct. 2, 2002, for U.S. Appl. No. 09/275,766, filed Mar. 25, 1999 by J.C. Hermansen, Total 11 pp. [57.92 (Amend3)].
Amendment 4, Jun. 18, 2003, for U.S. Appl. No. 09/275,766, filed Mar. 25, 1999 by J.C. Hermansen, Total 11 pp. [57.92 (Amend4)].
Amendment 5, Mar. 15, 2004, for U.S. Appl. No. 09/275,766, filed Mar. 25, 1999 by J.C. Hermansen, Total 30 pp [57.92 (Amend5)].
Response to Restriction Requirement, Aug. 5, 2004, for U.S. Appl. No. 09/275,766, filed Mar. 25, 1999 by J.C. Hermansen, Total 1 p. [57.92 (RspRestReq)].
Supplemental Amendment 6, May 13, 2004, for U.S. Appl. No. 09/275,766, filed Mar. 25, 1999 by J.C. Hermansen, Total 17 pp. [57.92 (SuppAmend6)].
Advisory Action 1, Apr. 28, 2004, for U.S. Appl. No. 10/055,178, filed Jan. 25, 2002 by J.C. Hermansen, Total 2 pp. [57.93 (AdvAct1)].
Amendment 1, Sep. 26, 2003, for U.S. Appl. No. 10/055,178, filed Jan. 25, 2002 by J.C. Hermansen, Total 8 pp. [57.93 (Amend1)].
Amendment 2, Apr. 12, 2004, for U.S. Appl. No. 10/055,178, filed Jan. 25, 2002 by J.C. Hermansen, Total 12 pp. [57.93 (Amend2)].
Amendment 3, Dec. 21, 2004, for U.S. Appl. No. 10/055,178, filed Jan. 25, 2002 by J.C. Hermansen, Total 6 pp. [57.93 (Amend3)].
Amendment 4, Apr. 28, 2005, for U.S. Appl. No. 10/055,178, filed Jan. 25, 2002 by J.C. Hermansen, Total 9 pp. [57.93 (Amend4)].
Amendment 5, Aug. 18, 2005, for U.S. Appl. No. 10/055,178, filed Jan. 25, 2002 by J.C. Hermansen, Total 21 pp. [57.93 (Amend5)].
Amendment 6, Aug. 7, 2006, for U.S. Appl. No. 10/055,178, filed Jan. 25, 2002 by J.C. Hermansen, Total 21 pp. [57.93 (Amend6)].
Amendment 7, Apr. 17, 2007, for U.S. Appl. No. 10/055,178, filed Jan. 25, 2002 by J.C. Hermansen, Total 18 pp. [57.93 (Amend7)].
Amendment 8, Oct. 29, 2007, for U.S. Appl. No. 10/055,178, filed Jan. 25, 2002 by J.C. Hermansen, Total 23 pp. [57.93 (Amend8)].
Amendment 9, Apr. 22, 2008, for U.S. Appl. No. 10/055,178, filed Jan. 25, 2002 by J.C. Hermansen, Total 15 pp. [57.93 (Amend9)].
Notice of Appeal, Apr. 12, 2004, for U.S. Appl. No. 10/055,178, filed Jan. 25, 2002 by J.C. Hermansen, Total 1 p. [57.93 (NtcApl)].
Notice of Non-Compliant Amendment, Jan. 18, 2008, for U.S. Appl. No. 10/096,828, filed Mar. 14, 2002 by L.A. Shaefer et al., Total 2 pp. [57.87 (NNCA)].
Virga, P. and S. Khundanpur, "Transliteration of proper Names in Cross-Language Applications", Proceedings of the 26th Annual International ACM SIGIR Conference on Research and Development in Informaion Retrieval, 2003, Total 2 pp.
Zobel, J., and P. Dart, "Phonetic String matching: Lessons from Information Retrieval", Proceedings of the 19th Annual International ACM SIGIR Conference on Research and Development in Information Retrieval, 1996, Total 8 pp.
Final Office Action 1, Jan. 17, 2002, for U.S. Appl. No. 09/275,766, filed Mar. 25, 1999, by J.C. Hermansen, Total 12 pp. [57.92 (FOA1)].
Final Office Action 1, Dec. 12, 2003, for U.S. Appl. No. 10/055,178, filed Jan. 25, 2002, by J.C. Hermansen, Total 9 pp. [57.93 (FOA1)].
Final Office Action 1, Mar. 27, 2006, for U.S. Appl. No. 10/096,828, filed Mar. 14, 2002, by L.A. Shaefer et al., Total 11 pp. [57.87 (FOA1)].
Final Office Action 1, Feb. 6, 2008, for U.S. Appl. No. 11/092,991, filed Mar. 30, 2005, by L.A. Shaefer et al., Total 18 pp. [57.89 (FOA1)].
Final Office Action 2, Dec. 18, 2002, for U.S. Appl. No. 09/275,766, filed Mar. 25, 1999, by J.C. Hermansen, Total 10 pp. [57.92 (FOA2)].
Final Office Action 2, Jun. 29, 2007, for U.S. Appl. No. 10/055,178, filed Jan. 25, 2002, by J.C. Hermansen, Total 36 pp. [57.93 (FOA2)].
Final Office Action 2, Jun. 11, 2008, for U.S. Appl. No. 10/096,828, filed Mar. 14, 2002, by L.A. Shaefer et al., Total 13 pp. [57.87 (FOA2)].
International Preliminary Examination Report, Dec. 15, 2004, for PCT/US2003/007786, Total 4 pp.
International Preliminary Report on Patentability, Mar. 30, 2006, for PCT/US2004/030293, Total 5 pp.
International Search Report, Jul. 2, 2003, for PCT/US2003/007786, Total 10 pp.
International Search Report and Written Opinion, Jan. 5, 2005, for PCT/US2004/030293, Total 4 pp.
Notice of Allowance 1, Feb. 15, 2005, for U.S. Appl. No. 09/275,766, filed Jan. 25, 2002 by J.C. Hermansen, Total 15 pp. [57.93 (NOA1)].
Notice of Allowance 1, Sep. 21, 2005, for U.S. Appl. No. 10/055,178, filed Jan. 25, 2002 by J.C. Hermansen, Total 6 pp. [57.93 (NOA1)].
Notice of Allowance 2, Jun. 9, 2008, for U.S. Appl. No. 10/055,178, filed Jan. 25, 2002 by J.C. Hermansen, Total 17 pp. [57.93 (NOA2)].
Notice of Allowance 3, Oct. 14, 2008, for U.S. Appl. No. 10/055,178, filed Jan. 25, 2002 by J.C. Hermansen, Total 6 pp. [57.93 (NOA3)].
Office Action 1, Dec. 7, 2007, for CN200480031553.8, Total 4 pp.
Office Action 1, Aug. 14, 2001, for U.S. Appl. No. 09/275,766, filed Mar. 25, 1999 by J.C. Hermansen, Total 11 pp. [57.92 (OA1)].
Office Action 1, Mar. 26, 2003, for U.S. Appl. No. 10/055,178, filed Jan. 25, 2002 by J.C. Hermansen, Total 8 pp. [57.93 (OA1)].
Office Action 1, Sep. 12, 2005, for U.S. Appl. No. 10/096,828, filed Mar. 14, 2002 by L.A. Shaefer et al., Total 13 pp. [57.87 (OA1)].
Office Action 1, Sep. 8, 2008, for U.S. Appl. No. 10/942,792, filed Sep. 17, 2004 by L. Shaefer et al., Total 58 pp. [57.88 (OA1)].
Office Action 1, Jul. 17, 2007, for U.S. Appl. No. 11/092,991, filed Mar. 30, 2005 by L.A. Shaefer et al., Total 18 pp. [57.89 (OA1)].
Office Action 1, Jun. 12, 2008, for U.S. Appl. No. 11/188,979, filed Jul. 26, 2005 by J.C. Hermansen et al., Total 16 pp. [57.86 (OA1)].
Office Action 3, Jul. 2, 2002, for U.S. Appl. No. 09/275,766, filed Mar. 25, 1999 by J.C. Hermansen, Total 10 pp. [57.92 (OA3)].
Office Action 3, Oct. 21, 2004, for U.S. Appl. No. 10/055,178, filed Jan. 25, 2002 by J.C. Hermansen, Total 24 pp. [57.93 (OA3)].
Office Action 3, Sep. 20, 2006, for U.S. Appl. No. 10/096,828, filed Mar. 14, 2002 by L.A. Shaefer et al., Total 10 pp. [57.87 (OA3)].
Office Action 3, Sep. 2, 2008, for U.S. Appl. No. 11/092,991, filed Mar. 30, 2005 by L.A. Shaefer et al., Total 33 pp. [57.89 (OA3)].
Office Action 4, May 27, 2005, for U.S. Appl. No. 10/055,178, filed Jan. 25, 2002 by J.C. Hermansen, Total 21 pp. [57.93 (OA4)].
Office Action 4, Apr. 10, 2007, for U.S. Appl. No. 10/096,828, filed Mar. 14, 2002 by L.A. Shaefer et al., Total 10 pp. [57.87 (OA4)].
Office Action 5, Sep. 15, 2003, for U.S. Appl. No. 09/275,766, filed Mar. 25, 1999 by J.C. Hermansen, Total 13 pp. [57.92 (OA5)].
Office Action 5, Apr. 7, 2006, for U.S. Appl. No. 10/055,178, filed Jan. 25, 2002 by J.C. Hermansen, Total 18 pp. [57.93 (OA5)].

(56) References Cited

OTHER PUBLICATIONS

Office Action 6, Oct. 19, 2006, for U.S. Appl. No. 10/055,178, filed Jan. 25, 2002 by J.C. Hermansen, Total 18 pp. [57.93 (OA6)].

Office Action 8, Jan. 22, 2008, for U.S. Appl. No. 10/055,178, filed Jan. 25, 2002 by J.C. Hermansen, Total 24 pp. [57.93 (OA8)].

Restriction Requirement, Jul. 26, 2004, for U.S. Appl. No. 09/275,766, filed Mar. 25, 1999 by J.C. Hermansen, Total 4 pp. [57.92 (RestReq)].

Restriction Requirement, Feb. 10, 2003, for U.S. Appl. No. 10/055,178, filed Jan. 25, 2002 by J.C. Hermansen, Total 4 pp. [57.93 (RestReq)].

Balakrishnan, R., "Country Wise Classification of Human Names", Proceedings of the 5th WSEAS International Conference on Artificial Intelligence, Knowledge Engineering and Data Bases, Feb. 2006, Total 6 pp.

Borgman, C.L., and S.L. Siegfried, "Getty's Synoname and Its Cousins: A Survey of Applications of Personal Name-Matching Algorithms", Journal of the American Society for Information Science, Aug. 1992, vol. 43, No. 7, Total 18 pp.

Branting, L.K., "Name Matching in Law Enforcement and Counter-Terrorism", ICAIL Workshop on Data Mining, Information Extraction, and Evidentiary Reasoning for Law Enforcement and Counter-Terrorism, Jun. 11, 2005, Total 4 pp.

Du, M., "Approximate Name Matching", Master's Degree Project Stockholm, Sweden 2005, Total 55 pp.

Feitelson, D.G., "On Identifying Name Equivalences in Digital Libraries", ACM, published on 2004, Total 17 pp.

Dr. Freeman, A.T., Dr. S.L. Condon, and C.M. Ackerman, "Cross Linguistic Name Matching in English and Arabic: A "One to Many Mapping" Extension of the Levenshtein Edit Distance Algorithm", Proceedings of the Human Language Technology Conference of the North American Chapter of the ACL, Total 8 pp., Jun. 2006.

Galvez, C. and F. Moya-Anegon, "Approximate Personal Name-Matching Through Finite-State Graphs", Journal of American Society for Information Science and Technology, 58(13), Jan. 2007, Total 17 pp.

MacFarlanea, G.J., M. Lunt, B. Palmer, C. Afzal, A.J. Silman, & A. Esmail, "Determining Aspects of Ethnicity Amongst Persons of South Asian Origin: The Use of a Surname-Classification Programme (Nam Pehchan)", Public Health Journal of the Royal Institute of Public Health, Jul. 2006, Total 6 pp.

Miller, K.J. & M.D. Arehart, "Improving Watchlist Screening by Combining Evidence from Multiple Search Algorithms", IEEE 2008, Total 5 pp.

Notice of Allowance 1, Aug. 18, 2009, for U.S. Appl. No. 11/092,991, filed Mar. 30, 2005 by L.A. Shaefer et al., Total 42 pp. [57.89 (NOA1)].

Patman, F. and P. Thompson, "Names: A New Frontier in Text Mining", Lecture Notes in Computer Science, Springer-Verlag Berlin, 2003, Total 12 pp.

Pfeifer, U., T. Poersch, and N. Fuhr, "Retrieval Effectiveness of Proper Name Search Methods", Information Processing & Management, 1996, vol. 32, No. 6, Total 13 pp.

Piskorski, J., M. Pikula, K. Wieloch, and M. Sydow, "Towards Person Name Matching for Inflective Languages", ACM, NLPIX 2008, Apr. 22, 2008, Total 10 pp.

Reuther, P., "Personal Name Matching: New Test Collections and a Social Network Based Approach", Mar. 16, 2006, Total 24 pp.

Preliminary Amendment 2, Jun. 23, 2004, for U.S. Appl. No. 10/055,178, filed Jan. 25, 2002 by J.C. Hermansen, Total 16 pp. [57.93 (PrelimAmend2)].

Response to Restriction Requirement, Mar. 7, 2003, for U.S. Appl. No. 10/055,178, filed Jan. 25, 2002 by J.C. Hermansen, Total 2 pp. [57.93 (RspRestReq)].

Preliminary Amendment 1, Aug. 22, 2008, for U.S. Appl. No. 12/197,119, filed Aug. 22, 2008 by J.C. Hermanson, Jr., et al., Total 14 pp. [57.93C1 (PrelimAmend1)].

Notice of Allowance 1, Jun. 10, 2011, for U.S. Appl. No. 12/197,119, filed Aug. 22, 2008 by J.C. Hermansen, Jr., et al., Total 35 pp. [57.93C1 (NOA1)].

Dataflux, "dfPower Studio", [online], [Retrieved Mar. 2005], retrieved from the Internet at <URL: http://www.dataflux.com/Product-Services/Products/dfpower-studio.asp>, Total 2 pp.

Datalever Corp, "DataLever Cleansing", [online], 2004, [Retrieved Mar. 2005], retrieved from the Internet at <URL: http://www.datalever.com/cleansing.html>, Total 8 pp.

French, J.C, A.L. Powell, & E. Schulman, "Applications of Approximate Word Matching in Information Retrieval", Proceedings of the Sixth International Conference on Information and Knowledge Management, 1997, Total 8 pp.

Global-Z Tech, "International Data Processing Services", [online], [Retrieved Mar. 2005], retrieved from the Internet at <URL: http://www.globalz.com/services/merge_purge.asp>, Total 9 pp.

Guy Software, "ParseRat", [online], [Retrieved Mar. 2005], retrieved from the Internet at <URL: http://www.guysoftware.com/parserat.htm>, Total 5 pp.

Hermansen, J.C., "Automatic Name Searching in Large Data Bases of International Names", Doctor of Philosophy Dissertation, Nov. 27, 1985, Total 152 pp.

Horng-Jyh, P.W., N. Jin-Chean, C.K. Soo-Guan, "A Hybrid Approach to Fuzzy Name Search Incorporating Language-Based and Text-Based Principles", Journal of Information Sciences, Revised Mar. 8, 2006, Total 26 pp.

Human Inference, "HIquality Name—Name Cleansing and Validation", [online], [Retrieved Mar. 2005], retrieved from the Internet at <URL: http://www.humaninference.com/products/hiquality-name>, Total 3 pp.

Identity Systems, "Identity Systems Products", [online], [Retrieved Mar. 2005], retrieved from the Internet at <URL: http://www.identitysystems.com>, Total 7 pp.

Infoplan, "Name Parser", [online], [Retrieved Mar. 2005], retrieved from the Internet at <URL: http://www.infoplan.com.au/nameparser/>, Total 4 pp.

Inforoute Inc., "NamePro Version 2.0 Name Parsing Software", [online], [Retrieved on Mar. 28, 2005], retrieved from the Internet at <URL: http://www.inforouteinc.com/prodB-1.html>, Total 2 pp.

Innovative Systems, Inc., "I/Lytics—Data Quality", [online], [retrieved Mar. 2005], retrieved from the Internet at <URL: http://www.innovativesystems.com/iLytics/quality.htm>, Total 5 pp.

Intelligent Search Technology, Ltd., "Name Search", [online], Archived Aug. 8, 2003, [retrieved on Sep. 28, 2005], retrieved from the Internet at <URL: http://www.intelligentsearch.com> and pages linked thereto, Total 6 pp.

Intelligent Search Technology, Ltd., "Intelligent Search Technology, Ltd.—Products ", [online], Archived Jun. 9, 2004, [retrieved on Sep. 28, 2005], retrieved from the Internet at <URL: http://www.name-searching.com> and pages linked thereto, Total 81 pp.

Intelligent Search Technology, Ltd., "ISTwatch—OFAC Searching, Patriot Act Compliance Software", [online], 2004, [retrieved on Sep. 27, 2005], retrieved from the Internet at <URL: http://www.intelligentsearch.com/ofac_software/index.html>, Total 15 pp.

Intelligent Search Technology, Ltd., "Name Search—Searching and Matching Software for Enterprise Systems", [online], 2004, [retrieved on Sep. 27, 2005], retrieved from the Internet at <URL: http://www.intelligentsearch.com/name_searching/index.html>, Total 33 pp.

LAS Inc., "Engineering Change Proposal #1—Name Search Technology Demonstration System Project", Contract 97-F131000-000, Jun. 9, 1998, Total 8 pp.

LAS Inc., "Engineering Change Proposal to the Statement of Work for the Name Search Research Project", Contract 95-F143100-000, Revision1, Apr. 12, 1996, Total 8 pp.

LAS Inc., "Final Report—Name Search Research Project: Phase 2", Contract No. 95-F143100-000, May 31, 1997, Total 69 pp.

LAS Inc., "Name Search Research Project", RFP 77-95FS, Technical Volume, Jun. 19, 1995, Total 12 pp.

LAS Inc., "Project Plan—Name Search Research Project: Phase 2", Contract No. 95-F143100-000, May 28, 1996, Revisions: Jun. 14, 1996, Total 19 pp.

LAS Inc., "Proposed Phase 3—Name Search Research Project", Recommendations for ECP of Contract No. 95-F143100-000, Mar. 24, 1997, Total 8 pp.

(56) References Cited

OTHER PUBLICATIONS

LAS Inc., "Recommendations for Automatic Name Search Research: Follow-up to the Name Search Technology Demonstration System", Feb. 9, 1998, Total 7 pp.

LAS Inc., "Report on Effectiveness: Task 5.7—Name Search Research Project", Mar. 1, 1996, Total 72 pp.

Notice of Allowance 1, Jun. 10, 2011, for U.S. Appl. No. 12/197,119, filed Aug. 22, 2008 by J.C. Hermanson, Jr., et al., Total 35 pp. [57.93C1 (NOA1)].

LAS Inc., "Statement of Work—Name Search Research Project", Apr. 25, 1995, Total 9 pp.

LAS Inc., "Statement of Work—Name Search: Technology Demonstration System", Apr. 24, 1997, Total 8 pp.

Supplemental European Search Report, Oct. 20, 2008, for EP Application No. 04784228.1, Total 2 pp.

Marx, M., and C. Schmandt, "Putting People First: Specifying Proper Names in Speech Interfaces", Proceedings of the 7th Annual ACM Symposium on User Interface Software and Technology, Nov. 1994, Total 11 pp.

Melissa Data, "Name Object for Windows", [online], [Retrieved on Mar. 28, 2005], retrieved from the Internet at <URL: http://www.melisadata.com/NameObject.htm>, Total 24 pp.

Millar, J.B., J.P. Wonwiller, J.M. Harrington, and P.J. Dermody, "The Australian National Database of Spoken Language", Proccedings of the IEEE International Conference on Acoustics, Speech, and Signal Processing, Apr. 1994, Total 4 pp.

MSI, Inc., "NADIS ScrubMaster/SearchMaster", Data Sheet, [online], [Retrieved Mar. 2005], retrieved from the Interent at <URL: http://www.msi.com.au/resources/documents/NScrub.pdf>, Total 3 pp.

Office of Research and Development, "Contract No. 95-F143100-000", Aug. 1, 1995, Total 79 pp.

Office of Research and Development, "Contract No. 97-F131000-000", Jul. 7, 1997, Total 54 pp.

Office of Research and Development, "Solicitation No. RFP 77-95FS", May 24, 1995, Total 72 pp.

Oshika, B.T., B. Evans, F. Machi, & J. Tom, "Improved Retrieval of Foreign Names from Large Databases", Proceedings of the Fourth International Conference on Data Engineering, Feb. 1988, Total 8 pp.

OTS Group, "Data Cleaning & Conversion: Putting Your Data in Experienced Hands", [online], [retrieved Mar. 2005], retrieved from the Internet at <URL: http://www.otsgroup.nl/>, Total 3 pp.

Peoplesmith Software, "Personator 3 for Windows", [online], [retrieved Mar. 2005], retrieved from the Internet at <URL: http://www.peoplesmith.com/>, Total 5 pp.

Pitney Bowes, "FineTune Data: Data Quality Solution—The Next Step for Unparalleled Data Quality", [online], [retrieved Mar. 2008], retrieved from the Internet at <URL: http://www.pbdmt.com/solutions/ftdfeat.htm>, Total 3 pp.

Red Pepper, LLC, "Name Parsing Software Review", Mar. 2005, Total 192 pp.

Roochnik, P., "Computer-Based Solutions to Certain Linguistic Problems Arising from the Romanization of Arabic Names", Dissertation for Doctor of Philosophy in Arabic, Georgetown University, Feb. 19, 1993, Total 375 pp.

Runner Technologies, "CLEAN_Address( )", [online], [retrieved Mar. 2005], retrieved from the Internet at <URL: http://www.runnertechnologies.com/clean_addr_features.html>, Total 6 pp.

Sagent, "Lifecycle Cleanse", [online], [retrieved Mar. 2005], retrieved from the Internet at <URL: http://www.sagent.com/products/lifecycle_cleanse_asp>, Total 4 pp.

Search Software America, "Data Searching & Matching: Software and Products", [online], Archived Jun. 2, 2002, [retrieved on Sep. 28, 2005], retrieved from the Internet at <URL: http://www.identitysystems.com> and pages linked thereto, Total 70 pp.

Semaphore Corp., "Namechop", [online], [retrieved Mar. 2005], retrieved from the Internet at <URL: http://www.semaphorecorp.com/nc/namechop.html>, Total 2 pp.

Service Objects, "DOTS Name Validation", [online], [retrieved Mar. 2005], retrieved from the Internet at <URL: http://www.serviceobjects.com/products/dots_namevalidation.asp>, Total 3 pp.

Strategic Applications, "ParseWare Library Overview", [online], [retrieved Mar. 2005], retrieved from the Internet at <URL: http://www.strategicapplications.com/parseware.cfm>, Total 3 pp.

Summit Technical Solutions, "Name and Address Validation", [online], [retrieved Mar. 2005], retrieved from the Internet at <URL: http://www.cms-summit.com/SoftwareSolutions/NameAddVal.htm>, Total 3 pp.

The Software Company, "Active Gender", [online], [retrieved Mar. 2005], retrieved from the Internet at <URL: http://www.softwarecompany.com/activex/activegender.htm>, Total 5 pp.

Valencia, E., and F. Yvon, "Identification de l'Origine Linguistique: le Cas de Noms Propres", Journees Scientifiques et Techniques du Reseau Francil, Avignon, Apr. 1997, Total 22 pp. {English Translation Included}.

Response to Office Action 1, dated Nov. 8, 2013, for U.S. Appl. No. 13/240,939, filed Sep. 22, 2011, 13 pp. [ROA1 (57.93CIP1)].

Final Office Action 1, Dec. 24, 2014, for U.S. Appl. No. 13/240,939, filed Sep. 22, 2011 by R.T. Gillam et al., Total 24 pp. [FOA1 (57.93CIP2)].

Amendment 2, Mar. 28, 2014, for U.S. Appl. No. 13/240,939, filed Sep. 22, 2011 by R.T. Gillam et al., Total 14 pp. [Amend2 (57.93CIP2)].

Office Action 1, Aug. 8, 2013, for U.S. Appl. No. 13/240,939, filed Sep. 22, 2011 by R.T. Gillam et al., Total 49 pp. [57.93CIP2 (OA1)].

Notice of Allowance, Apr. 10, 2014, for U.S. Appl. No. 13/240,939, filed Sep. 22, 2011 by R.T. Gillam et al., Total 11 pp. [NOA (57.93CIP2)].

* cited by examiner

LIA Data Stores

High Frequency

| | | | |
|---|---|---|---|
| H | S | Garcia | 3 |
| H | S | Salazar | 2 |
| H | S | Sambrano | 1 |
| A | B | Mahmoud | 4 |
| A | B | Jaffar | 2 |
| O | S | Silvestri | 1 |

N-Grams

| | | | | |
|---|---|---|---|---|
| H | S | S | ndez | 3 |
| H | S | G | for | 1 |
| H | S | P | bous | 1 |
| A | B | S | fig | 2 |
| O | S | E | agio | 1 |
| O | S | I | ahmo | 5 |

Morphology

| | | | | |
|---|---|---|---|---|
| A | B | S | addin | 3 |
| A | B | S | edin | 3 |
| A | B | S | uddin | 3 |
| O | S | P | etto | 1 |
| O | S | S | etti | 2 |
| O | S | S | ini | 1 |

TAQ

| | | | |
|---|---|---|---|
| H | S | de | 1 |
| H | S | la | 1 |
| H | S | las | 1 |
| A | B | bin | 3 |
| O | B | el | 1 |
| O | B | lo | 1 |

Digraph Distribution Processor Data Stores

Digraphs

| | | |
|---|---|---|
| A | ez | -1.0422 |
| A | nt | 22.8733 |
| A | bd | 38.7221 |
| H | bd | 1.0572 |
| H | ez | 42.5947 |
| H | ri | 16.1242 |

Trigraphs

| | | |
|---|---|---|
| A | ez# | -10.0422 |
| A | #nt | -48.1743 |
| A | bd# | 48.4551 |
| H | bd# | -32.1742 |
| H | ez# | 47.5327 |
| H | #ri | 11.1242 |

Digraph Processor Parameters

| | |
|---|---|
| A | 44.2331 |
| H | -32.8765 |

LID Parameters

| | | | |
|---|---|---|---|
| HFNAME | S | 10 | 8 |
| HFNAME | G | 8 | 6 |
| TAO | S | 5 | 3 |
| TAO | G | 4 | 2 |
| MORPHOLOGY | S | 5 | 3 |
| MORPHOLOGY | G | 4 | 2 |
| NGRAM | S | 4 | 3 |
| NGRAM | G | 3 | 2 |

Threshold Parameters

| | | | | |
|---|---|---|---|---|
| A | 50 | 1.4532 | 10 | 8 |
| H | 73 | 20.5000 | 5 | 6 |
| O | 38 | (null) | 100 | 3 |

FIG. 5

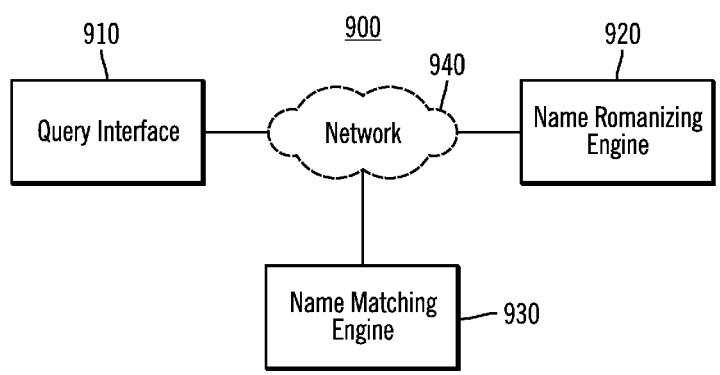
FIG. 9A
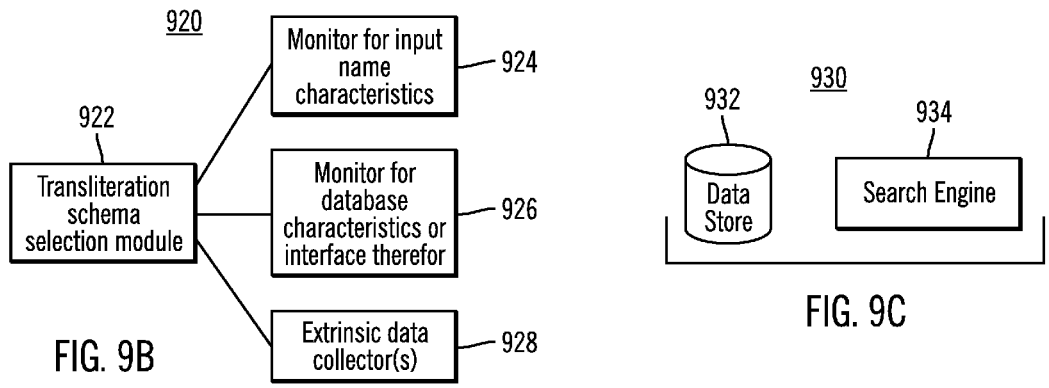
FIG. 9B
FIG. 9C

| | 932 | |
|---|---|---|
| | Romanized Form | Native Orthographic Form |
| 936a — | Efim Belinsky | Ефим Belinskiy |
| 936b — | Efim Belinskiy | Ефим Belinskiy |
| 936c — | Efim Belinsky | Ефим Белинский |

FIG. 9D

| 1200 | Cross-Language Name Searching with NHTS and NameHunter™ |

*Click here to learn more about this demo.*
*Click here to see the names NameHunter is searching.*

Given-Name(s): | Ефим |   Surname(s): | Белинский |

Data List To Search: | LDS Demo Database August 2003 ▼ |   Name Type: | (AutoClassify) ▼ |

Search Type | --Choose a Search Type-- ▼ |   | Search |

Please enter the name you wish to find (romanized or cyrillic)

FIG. 12

| 1300 | Cross-Language Name Searching with NHTS and NameHunter™ |
|---|---|

*Click here to learn more about this demo.*
*Click here to see the names NameHunter is searching.*

Given-Name(s): [          ]    Surname(s): [          ]

Data List To Search: [LDS Demo Database August 2003 ▼]    Name Type: [(AutoClassify) ▼]

Search Type [--Choose a Search Type-- ▼]    [Search]

1310a — Romanizing: Ефим...(Cyrillic)->Efim
1310b — Romanizing: Белинский...(Cyrillic)->Belinskiy NameHunter Narrow Wide Search results for Белинский, Ефим

| NameHunter Matches (4) | | |
|---|---|---|
| NameHunter Name | Score | LAS ID |
| BELINSKIY, EFIM | 1.000000 | 525595 |
| BILINSKIY, EVFIM AFANASEV | 0.763636 | 600994 |
| YEVELINSKIY, YEFIM | 0.727273 | 530546 |
| YEVELINSKIY, YEFIM | 0.727273 | 507351 |

*Click on the LAS-ID to see the name in its original form*

FIG. 13

IDENTIFYING RELATED NAMES

CROSS-REFERENCE TO RELATED APPLICATIONS

This application is a continuation-in-part application and claims the benefit of U.S. Pat. No. 8,041,560, having U.S. application Ser. No. 12/197,119, filed Aug. 22, 2008, which is a continuation of U.S. application Ser. No. 10/055,178, filed Jan. 25, 2002 now abandoned, which is a continuation of and claims the benefit of U.S. Pat. No. 6,963,871, having U.S. application Ser. No. 09/275,766, filed Mar. 25, 1999, which is a non-provisional of and claims the benefit of U.S. Provisional Patent Application No. 60/079,233, filed Mar. 25, 1998, and the entire contents of each of these applications is incorporated herein by reference.

COPYRIGHT

A portion of this disclosure contains material in which copyright is claimed by the applicant and/or others. The copyright owner has no objection to the copying of this material in the course of making copies of the application file or any patents that may issue on the application, but all other rights whatsoever in the copyrighted material are reserved.

BACKGROUND

Embodiments of the invention relate to identification of related names. Also, embodiments of the invention relate generally to automatic data processing systems that search and retrieve records from a database based on matching of personal names, and to improved systems and methods for intelligently processing name comparisons.

Information about individuals is often stored in a computer. Access to that information is most readily gained by using the name of the individual involved. The nature of names, however, their behavior and permutations, pose significant challenges to information retrieval. Names vary during one's life (e.g., through marriage or professional preparation); they take on different forms, depending on the formality of the situation (WILLIAM CARVER/BILLY CARVER); they may be spelled differently if recorded by someone other than the individual (PRICE PRIES). To amplify the difficulties even more, naming conventions vary across cultures. It may not be appropriate to assume that the typical American name structure of single given name (first name), single middle name or initial followed by a surname (last name) applies in a database that contains names from all over the world, a situation that is usual in today's world of global technology and communication. Names from other cultures may have compound surnames or may be composed of only one name. Names written in writing systems other than Roman may be transcribed in a variety ways into the Roman alphabet because there is no single way to represent sounds that occur in another language but do not occur in English, causing significant differences in the spelling (KIM/GHIM).

Adequate information retrieval that is based on the name must anticipate the range and kinds of variation that can occur in names, both generally and in specific cultures. Other name search or information retrieval systems are generally unable to recognize or address the full range of variation in names. Some systems assume that names are static and search only for an exact match on the name. These systems cannot accommodate even the slightest spelling variations, initials or abbreviations (JOS. Z. BROWN/JOSEPH ZACHARY BROWNE). Other systems may use techniques or keys (such as Soundex or Soundex-like keys) that permit some minor spelling differences between names (DORSHER/DOERSHER) but these techniques generally fail to cope with significant variation (DOERSHER/DOESHER) or problems posed by names from non-Anglo cultures (ABDEL RAHMAN/ABDURRAMAN). If cultural differences are recognized, it is typically through use of equivalency lists or tables. Some of the more common variants can be accommodated in this way, but retrieval is then limited to those items on the list and cannot accommodate new representations or random variation or keying errors (GOMEZ/BOMEZ).

For a system to reach a level of adequacy for automatic name searching, it must therefore address a diverse set of issues related to name variation. Although spelling variations can often be addressed through character-matching techniques (e.g., SMITH/SMYTH), false-positive matches can result from traditional string or character comparisons when common morphological endings, such as OVICH, occur at the end of otherwise dissimilar names (e.g., ZELENOVICH/JOVANOVICH). Transcription from foreign writing systems to the Roman writing system poses additional spelling concerns. Different character sets, dialectal variations and sounds that are not represented in Roman alphabetic form at all contribute to the possibility of multiple, and often inconsistent, representations of the same name. A single Chinese character (ideogram) can be transcribed to produce numerous roman forms that have little or no resemblance to one another due to dialectal variations. For example, the character CHANG, JANG and ZHANG are different roman representations of the exact same Chinese name, as are the names WU, MHO and ENG. Similarly, a single Arabic name can result in transcriptions as diverse as KHADHAFI, CODOFFI, QATHAFI.

Character-based systems may also be confronted with significant retrieval problems caused by names with the same pronunciation but with divergent spellings. WOOSTER, WORCHESTER, and WUSTER may all share at least one identical pronunciation and yet show very different spellings. When name data are shared orally, the speaker's pronunciation, the listener's hearing (or mishearing) of the name and the speaker's expectations about the spelling of the name will impact the final written representation of a name. For example, a telephone reservationist may record a caller's name with a variety of phonetically correct spellings, which may not correspond (and may therefore not be matched to) an existing database record for that caller.

Another common cause of name variation, which creates retrieval difficulty for name search systems, is the inclusion or exclusion of name data. Depending on the data source, names may be formal such as THOMAS EDWARD WINTHROP III, or informal such as TOM WINTHROP. An ideal name search system would be capable of correlating these two names, even though only a portion of the full name is available. To predict the relationship among variant formats of names, the system must also be able to recognize what rules govern which elements can be deleted or included or changed in different cultures. MARIA DEL CARMEN BUSTOS SAENZ will become MARIA DEL CARMEN BUSTOS DE LOPEZ, if she marries JUAN ANTONIO LOPEZ GARCIA. Predicting the relationship between these names is fundamental to retrieval success.

In many name search applications, it is important to identify variant forms of a name that are considered legitimate and to link and preserve the variations; in others, it may be appropriate to establish one form of a name and to treat all other forms as errors. Even if the data base is cleaned by linking variant forms and eliminating identifiable errors, users may search for names under yet more variations.

U.S. Pat. No. 5,040,218 to Vitale et al. discloses a voice synthesis system which attempts to identify the origin of a name to enhance pronunciation. The system first searches a dictionary for a name, and if the name is not found, uses grapheme and n-gram analysis to identify the name's likely origin. Similarly, U.S. Pat. No. 5,062,143 to Schmitt shows a system that identifies name origin using n-gram analysis.

U.S. Pat. No. 5,724,481 to Garberg et al. shows a method of matching proper names in a database using a phonemic representation.

U.S. Pat. No. 5,758,314 to McKenna shows an international database processing system. However, this system uses Soundex algorithms to process Unicode input for all cases, rather than providing a name searching system with culture-specific algorithms.

Design Pat. D359,480 shows an IPA-based computer keyboard, but does not disclose any use of IPA for identifying data records.

The article "Identifying Source Languages: the Case of Proper Names" by Valencia and Yvon (1997) discloses statistical models for name searching based on n-gram comparisons. The article also discloses determination of the source language and the use of different statistical models for comparisons, based on the source language.

John Hermansen, a named inventor, authored a doctoral dissertation, "Automatic Name Searching in Large Data Bases of International Names" (1985) which explores the concept of cultural differences in names. The document suggests searching using different culturally specific algorithms, but discloses only a simple n-gram based algorithm.

The assignee has developed a software program known as PC-NAS. An early version of this program was incorporated into a government computer system more than one year before the priority date of this application. This early version performed name searching using a combination of n-gram distribution and positional properties, and included a limited name regularization algorithm as part of an Arabic processing algorithm. Its architecture included sets of algorithms applicable to different cultures, but no automatic classification of the cultural origin of a name.

U.S. Pat. No. 5,485,373 to Davis et al. discloses a text searching system which relies on a Unicode representation (not a phonetic alphabet). The Davis system may vary algorithms based on the language being searched, but has no name classifier. This system is not designed to search for proper names; comparisons are performed based on a Unicode representation, which is not a phonetic alphabet.

Other patents relating generally to computerized language analysis and processing include: U.S. Pat. No. 5,323,316 to Kadashevich et al.; U.S. Pat. No. 5,337,232 to Sakai et al.; U.S. Pat. No. 5,369,726 to Kroeker et al.; U.S. Pat. No. 5,369,727 to Nomura et al.; U.S. Pat. No. 5,371,676 to Heemels et al.; U.S. Pat. Nos. 5,375,176 and 5,425,110 to Spitz; U.S. Pat. No. 5,377,280 to Nakayama; U.S. Pat. No. 5,432,948 to Davis et al.; U.S. Pat. No. 5,434,777 to Luciw; U.S. Pat. No. 5,440,663 to Moese et al.; U.S. Pat. No. 5,457,770 to Miyazawa; U.S. Pat. No. 5,490,061 to Tolin et al.; U.S. Pat. No. 5,515,475 to Gupta et al.; U.S. Pat. No. 5,526,463 to Gillick et al.; and U.S. Pat. No. 5,548,507 to Martino et al.

None of these earlier systems provide a satisfactory system and method for multicultural name searching. Thus, the inventors believe there is a need for an improved system and method for searching name-based records and for determining the degree of similarity between two name representations.

A database is a collection of information organized in such a way that a computer program can quickly and easily select desired pieces of data. A database typically includes a number of records, and each record includes one or more fields. Each field typically stores a single piece of information.

In such databases, retrieval of records that are associated with a person typically involves use of a unique identifying value or "key", such as an ID number. For certain retrieval tasks, a unique identifying value is not always available, and the person's name itself must be used as the identifying value or "key".

However, personal names have several limitations inhibiting their effectiveness as identifying values for retrieval of information from a database. For example, personal names are not unique. Numerous individuals may possess names with some or even all elements in common with many other individuals. In extreme cases, the same name may be commonly used by thousands or even millions of different people. Conversely, people who are closely related sometimes exhibit significant differences in the way each spells a commonly held family name. Moreover, a specific person may be represented in many different records with a database, and that person's name may be rendered in slightly or greatly differing forms within those database records.

Additionally, names are not used consistently. Within the U.S. society, as indeed in most societies around the world, individuals are permitted a certain degree of latitude in determining the form of the name they provide, orally or in writing, when providing information that is subsequently placed in a database.

Furthermore, names change over time. Names are social objects that are used to record various kinds of information, so they can be modified in various ways as time passes, in order to reflect changes in social or personal status by the bearer. In many Western societies, for example, names may change over time in order to reflect changes in marital status, educational or professional achievements, or even gender affiliation.

Yet another drawback of using personal names as a database key is that names are not consistently captured. Because it is more difficult to validate the spelling of names than it is to validate the spelling of most other words in a particular language, name information in a database is correspondingly subject to a greater incidence of spelling and keying errors.

Amplifying the difficulties associated with using personal names as identifiers, naming conventions tend to vary across cultures. It may not be appropriate to assume that the typical American name structure of single given name (first name), single middle name or initial followed by a surname (last name) applies to a database that contains names from all over the world. For instance, names from other cultures may have compound surnames or may be composed of only one name.

Moreover, between languages/cultures and within a single language/culture, names may have different forms and variations. Several variations of the same name may refer to a single person or entity. For example, a name may be spelled differently based on the language in which it is written, with different spellings referring to a single person. In addition, a person's name and its prefixes/suffixes may change in patterned, predictable ways as the result of an event, such as marriage, widowhood, or graduation from professional school. Similarly, typing errors or other sources of noise may create a variation on a name that is to refer to the same person as the original name. Rather than treating each variation of a name as referring to a distinct person or entity, it may be advantageous to match variations of a name that may all refer to the same person.

SUMMARY

Provided are a method, computer program product, and system for identifying related names. A collection of names from different languages is stored, wherein each of the names has a native orthographic form and a romanized form. An input name is received in a known encoding scheme. An alphabet of the input name is determined based on the known encoding scheme. One or more romanized names are generated based on the query name and the determined query name alphabet. Culture-sensitive regularization rules are applied to create an additional romanized name. The one or more romanized names and the additional romanized name are matched against the romanized names in the collection of names from the different languages. Data store records that have romanized names that match the one or more romanized names or the additional romanized name are returned.

BRIEF DESCRIPTION OF THE SEVERAL VIEWS OF THE DRAWINGS

Referring now to the drawings in which like reference numbers represent corresponding parts throughout:

FIG. 5 shows a sample structure for data tables used in the linguistically informed decision processor of FIG. 4 in accordance with certain embodiments.

FIGS. 9A, 9B, and 9C are block diagrams illustrating the structure, arrangement, and operation of exemplary systems capable of identifying related or matching names, such as versions of a name that may be used in one or more languages in accordance with certain embodiments.

FIG. 9D is a schematic diagram illustrating the contents of a database containing names in a native orthographic form as well as a transliterated form of the native orthographic form in accordance with certain embodiments.

FIGS. 12, 13, and 14 illustrate exemplary interfaces used to enable input and output with respect to a user seeking to identify related names in accordance with certain embodiments.

DETAILED DESCRIPTION

Figure 1:
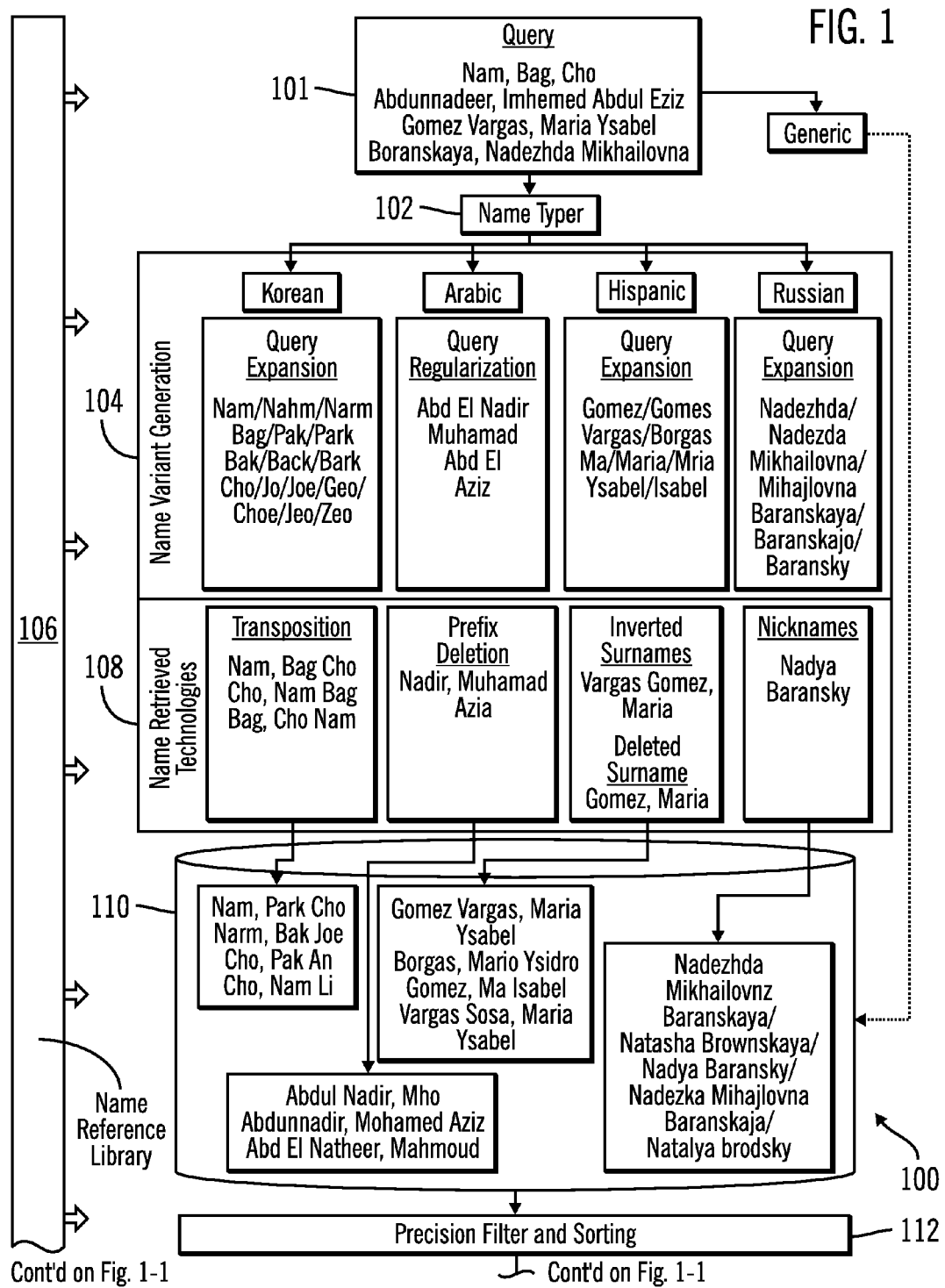
FIG. 1 is a block diagram of the structure of an improved name searching and comparison system in accordance with certain embodiments.
Figure 1:
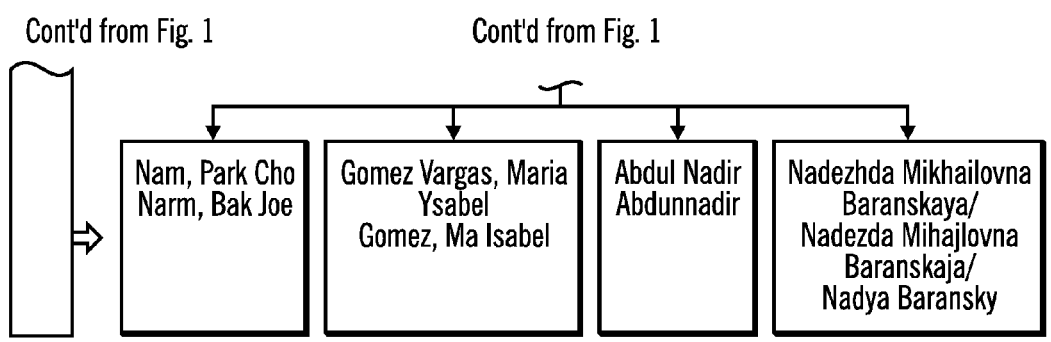

In the following description, reference is made to the accompanying drawings which form a part hereof and which illustrate several embodiments of the invention. It is understood that other embodiments may be utilized and structural and operational changes may be made without departing from the scope of the invention.

It is a general object of the present invention to provide a name searching system architecture with multiple processing options, which automatically selects and uses an appropriate cultural-specific set of algorithms to search for database names and evaluate their proximity to an input name (also referred to as a query name).

Another broad object of the invention is to provide a system and method implementing multi-algorithm name searching strategies, where search processing differs based on one or more of: culture, ethnicity, distribution, and language.

Another more specific object of the invention is to provide an improved system and method for conducting searches using a combination of n-gram distribution and positional properties to identify matches.

A further object of the invention is to provide an improved cultural name classifier which leads to application of an appropriate set of name-regularizing linguistic rules that generate a standardized name based on stored cultural intelligence.

Yet another object of the invention is to provide an improved name classifier, incorporating a multi-step process, including preemptive lists, linguistic rules, n-gram analysis, and additional algorithms.

A further object of the invention is to provide an improved name searching system, incorporating segment-level pre-processing. Segmentation rules and syllabic stress rules contribute to a determination of where "white space" should appear in the name. Algorithms determine which graphemes are mapped to which phonemes (based on phonological, historical, and morphological principles).

Another significant object of the invention is to provide a name searching system and method incorporating an innovative key-searching system based on the International Phonetic Alphabet (IPA). This technique converts the input name to a plurality of IPA representations, which are then used to select matching keys in a first pass through the database.

A further object of the invention is to provide a name searching system and method that selectively uses sets of generic and language-specific spelling rules to infer possible phonological manifestations for personal names. A unique aspect of the comparison algorithm derives a scored match based on atomic phonological features.

Additional objects and advantages of the invention will be apparent upon review of the specification, including its drawings and appendices A-N.

The present invention provides an improved automatic data processing system for searching names and an improved process for effectively searching and retrieving personal names in a database. It also provides a mechanism for a user to determine the distance between two names, i.e., how closely two personal names match.

In one aspect of the invention, "fuzzy logic" name searching and matching technology is provided to locate a target database record despite a lack of absolute identity between an input name and a record name.

In one embodiment, a complete automated name searching system is provided, incorporating various advantageous features of the present invention. The automated search system incorporates an automatic name classifier, a multi-path architecture in which different algorithms are applied based on cultural identity of the name, name variant generation, query regularization and expansion, compensation for transpositions, affixes, and inversions, and sorting and filtering of output. The name classifier incorporates a preemptive list, analysis of morphological elements, length, and linguistic rules. The name regularizer produces a computer recognized form (character based computational representation) rather than a human recognizable form of the name. The software design uses a pronunciation equivalent (e.g. IPA) representation and language specific rules to generate name searching keys, which are used in a first pass to eliminate database entries which are obviously not matches for the name of interest.

In another embodiment, the inventive search methodologies are implemented as Application Program Interfaces (APIs) that can be integrated into an existing program application or can be used to provide the foundation for a new program application that requires name matching capabilities. In API form, the features of the present invention may be selectively used in various combinations is depending on the requirements of the particular application. A callable set of library routines include an intelligent preprocessor and a name evaluator that produces a score comparing an input name and database name, based on a variety of user-adjustable parameters. The user-controlled parameters permit tuning of the search methodologies for specific custom applications, so as to achieve desired levels of precision and recall for name searching in widely varying operational settings.

FIG. 1 shows a multi-algorithmic name search system 100 in accordance with certain embodiments, in block schematic form. In this embodiment, system 100 sequentially performs three basic processes. First, system 100 selects a search strategy based on the cultural origin, distribution, language or ethnicity of the name in question and pre-processes the name to break it into its component parts for processing. Second, a subset of the available database records is selected, based on a culture-relevant key-indexing strategy. The objective of this subsetting process is to select a set of keys that are likely matches for the name in question. Finally, the records selected in the second process are subjected to a similarity measurement, using a complex algorithm tailored according to the selected search strategy, to evaluate and rank-order potential matches. Thus, system 100 adopts a search strategy that is specific to the ethnicity or cultural origin of the name to be matched and implements that strategy by performing a two-pass search with algorithms particularly adapted for searching those names.

Referring now to FIG. 1, system 100 comprises name classifier module 102, variant generation module 104, name reference library 106, name retrieval technology processing module 108, retrieval module 110, and precision filter and sorting module 112. System 100 has an input query 101 and an output 114.

Processing of a query begins with evaluation of the searched name by name classifier module 102. Name classifier module 102 evaluates spelling, word segmentation, titles, prefixes and suffixes, and other identifiable features of the name to determine whether it falls into one of a predetermined set of identified cultural origins, including, for example, Chinese, Arabic, Hispanic, or Russian. Anglo names and names which do not fall into one of the predetermined set of special-case cultures are classified as "other" and processed according to a generic cultural algorithm. Appropriate pre-processing is also performed to segment the name appropriately (standardize the handling of spacing between name segments and the order of the segments) and identify apparent surnames, given names, honorifics, etc., that are part of the input name. The operation of the name classifier in this regard is unique and inventive. To determine the type of name, name classifier module 102 may use one or more of the following, depending on the observed characteristics of the name in question: a list of names which occur with high frequency in various cultures (used to preemptively type common names without extensive algorithmic processing), culture-specific linguistic rules in the form of a Titles, Affixes, and Qualifiers (TAQ) lookup table, n-gram based name typing, and name length. N-gram name typing according to the present invention may be performed as a digraph, trigraph or other n-gram analysis where both positional and distributional properties of the n-grams (e.g., digraphs and trigraphs) are used in the algorithm for making the type determination. Name classifier module 102 preferably operates according to the software design description in Appendix A, which forms a part of this specification.

Figure 3:
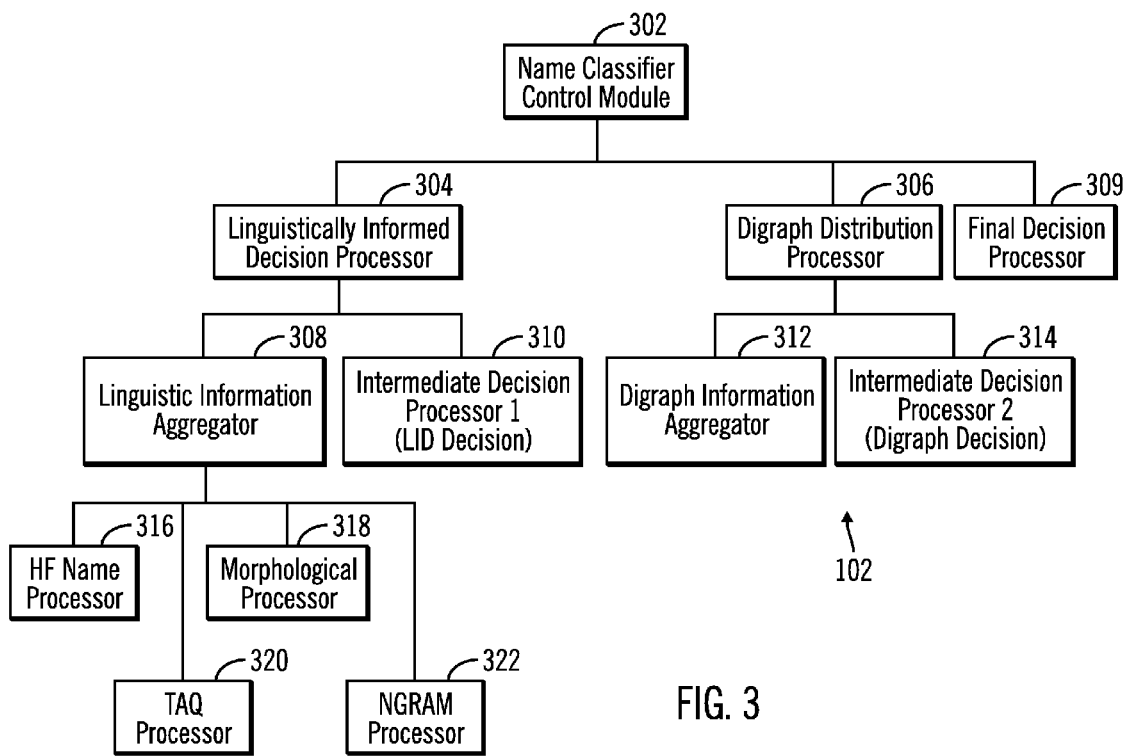
FIG. 3 is a block diagram showing the structure of a name ethnicity classifier in accordance with certain embodiments.

FIG. 3 shows the software modules incorporated in name classifier module 102 in more detail in accordance with certain embodiments. Name classifier module 102 incorporates a name classifier control module 302, a linguistically informed decision (LID) processor 304, a digraph distribution processor 306, and a final decision processor 309. Digraph distribution processor 306 incorporates digraph information processor 312 and digraph intermediate decision processor 314.

LID processor 304 incorporates linguistic information aggregator 308 and LID intermediate decision processor 310. LID aggregator 308 includes high frequency name processor 316, morphological processor 318, title/affix/qualifier (TAQ) processor 320, and ngram processor 322.

LID processor 304 accumulates and weighs factors from multiple knowledge sources to determine whether there is sufficient evidence to identify the input name as belonging to a particular ethnicity, e.g. Hispanic, Arabic, etc. Linguistic information aggregator 308 performs linguistic analysis, gathering information and scoring for the input name. In embodiments, linguistic information aggregator 308 generates scores from four data sources. High frequency name processor 316 accesses a high frequency name data store of names that occur frequently in particular cultures. A match with one of these names causes aggregator 308 to retrieve and record the culture associated with the name and a confidence score associated with that name. TAQ processor 320 breaks the name into particles and makes use of the information contained in those particles to match a list of titles, affixes, and qualifiers commonly used in names of various cultures, to help determine cultural affinity. The input name is segmented based on spaces in the name, and for each segment present in the input name, TAQ processor 320 determines whether that segment is a particle present in a TAQ data store. If so, TAQ processor 320 retrieves and records the culture, name field, and confidence score associated with that TAQ particle.

Morphological processor 318 processes morphological elements such as "-ovich" which suggest a particular cultural affinity. Morphological processor 318 determines whether morphemes in a morpheme data store are present in the input name by searching for matching substrings of the name segments in the input name. For each morpheme found in the input name, morphological processor 318 records the morpheme found, the culture, name field, and confidence level associated with that morpheme.

N-gram processor 322 searches the input name for strings of letters that occur with statistical significance in names with a given cultural affinity. For each n-gram present in an associated n-gram data store, n-gram processor 322 determines whether that n-gram is present in the input name. When a match is found, the processor records the n-gram found, the culture, name field, and score associated with that n-gram.

To avoid conflict between treatment of name segments and particles by the various processing modules operating on the input name, an order of precedence is established for processing. The order of precedence is preferably TAQ particle, morpheme, and then n-gram. That is, if a string of letters is identified as a TAQ particle, that string or any substring cannot also be identified as a morpheme or n-gram for that culture. If a string is identified as a morpheme, that string and its substrings cannot be considered as part of an n-gram for that culture. Locating the name among the high frequency names for a culture does not preclude morpheme or n-grams processing of the high frequency name, but if the confidence level in the high frequency match is high, further processing may not be necessary.

Figure 4:
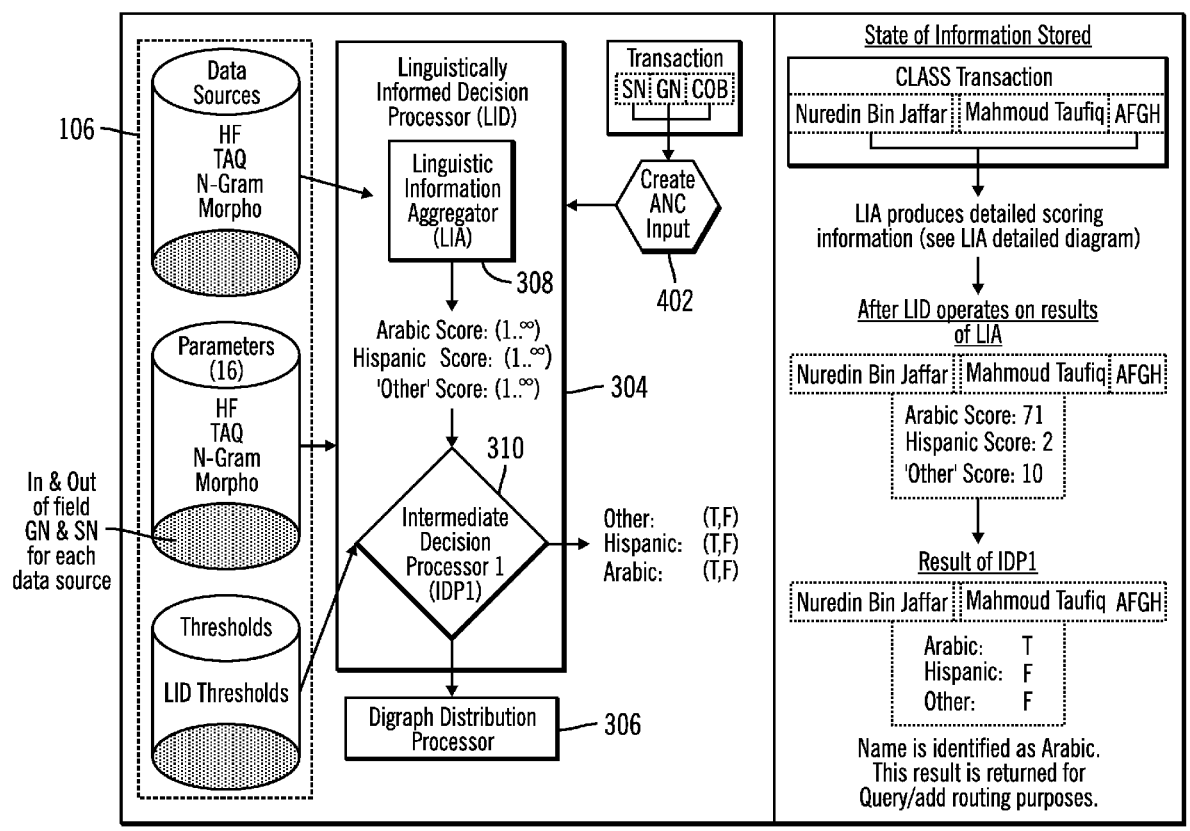
FIG. 4 is a schematic diagram showing the structure and operation of a linguistically informed decision processor used in the classifier of FIG. 3 in accordance with certain embodiments.

FIG. 4 is a schematic diagram showing the structure and operation of linguistically informed decision processor 304 in more detail in accordance with certain embodiments. Linguistic information aggregator 308 collects necessary information from the input name 402 and name reference library 106, which includes the tables and other data used by linguistic information aggregator 308 (including high frequency name processor 316, morphological processor 318, title/affix/qualifier (TAQ) processor 320, and ngram processor 322, all shown in FIG. 3). A sample structure for these tables is shown in FIG. 5 in accordance with certain embodiments.

As shown in FIG. 4, processed information from linguistic information aggregator 308 passes to LID intermediate decision processor 310, where it is processed and the results passed to digraph distribution processor 306 or to final decision processor 309 (shown in FIG. 3).

LID intermediate decision processor 310 makes a preliminary decision about the cultural affinity of the name, based on the scoring information gathered by linguistic information aggregator 308. Processor 310 determines whether enough linguistic information has been gathered by LIA 308 to confidently determine that the input name belongs to one of the cultures identified by the system. Processor 310 accepts as input one aggregate LID score for each culture, as well as an aggregate LID score for "other." For each score, processor 310 compares the score to a LID threshold for the appropriate culture. If the LID score for a culture exceeds the threshold for that culture, processor 310 returns a value of "true" for the indicated culture. A "true" value for a culture indicates that enough evidence has been gathered to confidently identify the name as belonging to that culture. A "false" value for a culture indicates that not enough evidence has been accumulated to suggest that the name belongs to that culture. Alternatively, processor 310 may return a value for each culture equal to the LID score minus the LID threshold for that culture; in this case, negative values correspond to "false" and positive values correspond to a "true" indication.

Names which are strongly associated with one culture based on the output of LID intermediate decision processor 310 will not be processed further to identify their cultural origin, i.e. digraph and other analysis will be skipped.

Assuming the name has not been definitely identified, the surname portion is processed by digraph distribution processor 306. Based on a statistical model derived from digraph distribution statistics for names within various cultures, processor 306 computes a likelihood that the input name has a particular cultural origin. The information gathered from LID and digraph processing is combined, along with any other available information on the person (such as country of birth), in final decision processor 309. The available factors are weighted according to their confidence level to maximize the likelihood of an accurate ethnic origin evaluation. The result is an output indicating the likely classification of the name.

Following name typing, the system executes name variant generation module 104, which pre-processes the names according to culture-specific rules to generate query regularizations, based on algorithms adapted specifically for the cultural origin of the name in question, as determined by the name classifier. Variant generation module 104 also generates query expansions, i.e., identifies expected variants of the name to enhance matching capability.

Figure 6:
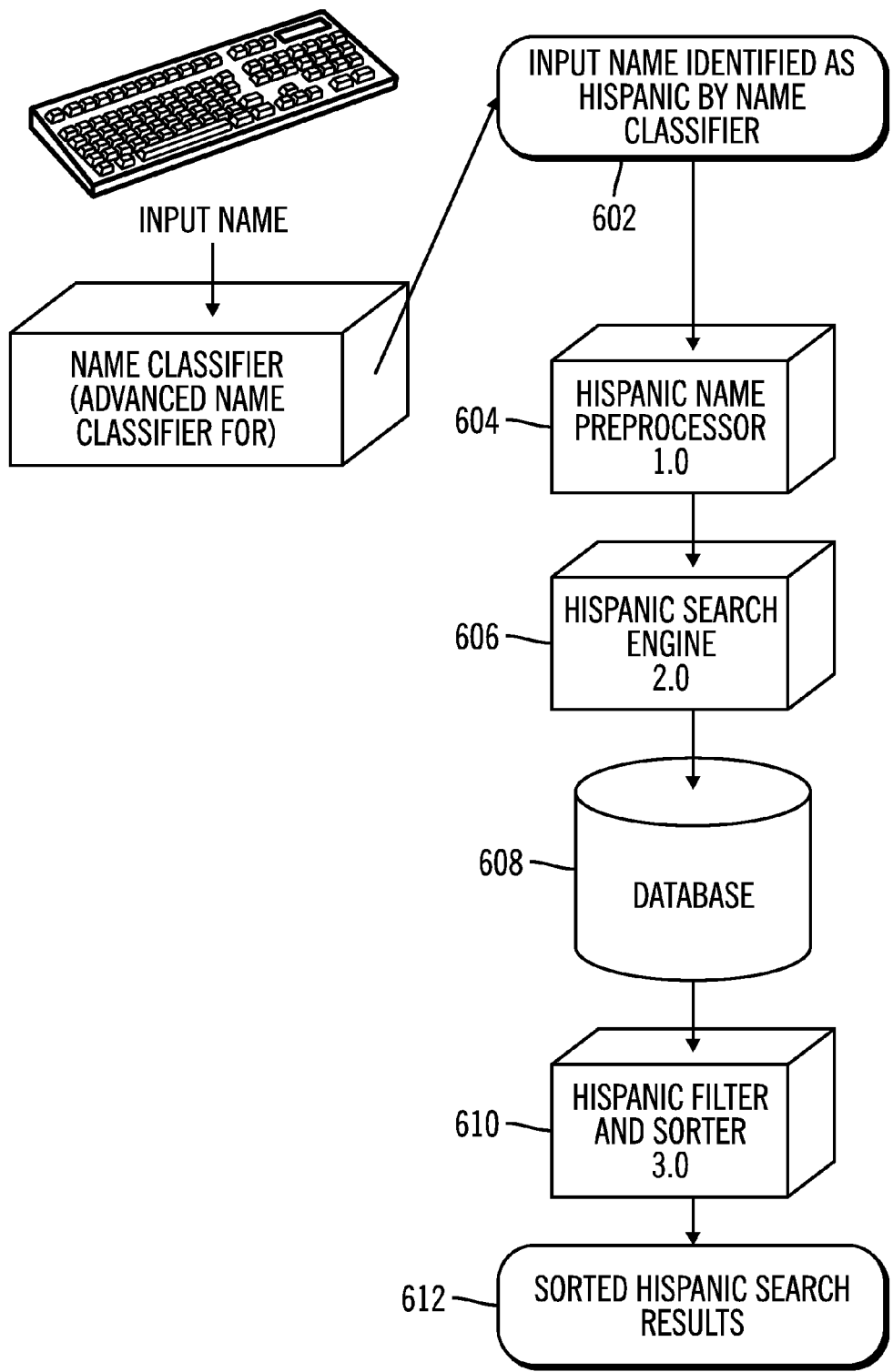
FIG. 6 is a flowchart showing an Hispanic name searching process used in accordance with certain embodiments.

As noted above, preferably, specialized processing is provided for each of a variety of ethnic name origins. Appendices B and C, which form a part of this specification, are software design descriptions for preprocessing and search algorithms for Arabic and Hispanic type names, respectively. As an example of such processing, the Hispanic processing algorithm referenced in Appendix C will now be discussed in some detail. FIG. 6 is a flowchart showing Hispanic name processing used in accordance with certain embodiments. The process begins in name classification in block 602 when the input name is identified as an Hispanic name. The name is then fed to Hispanic name preprocessor in block 604, and to the Hispanic search engine in block 606, which searches database 608. Then, an Hispanic sorter and filter are applied in block 610. The process produces sorted Hispanic search results as an output in block 612.

Figure 7:
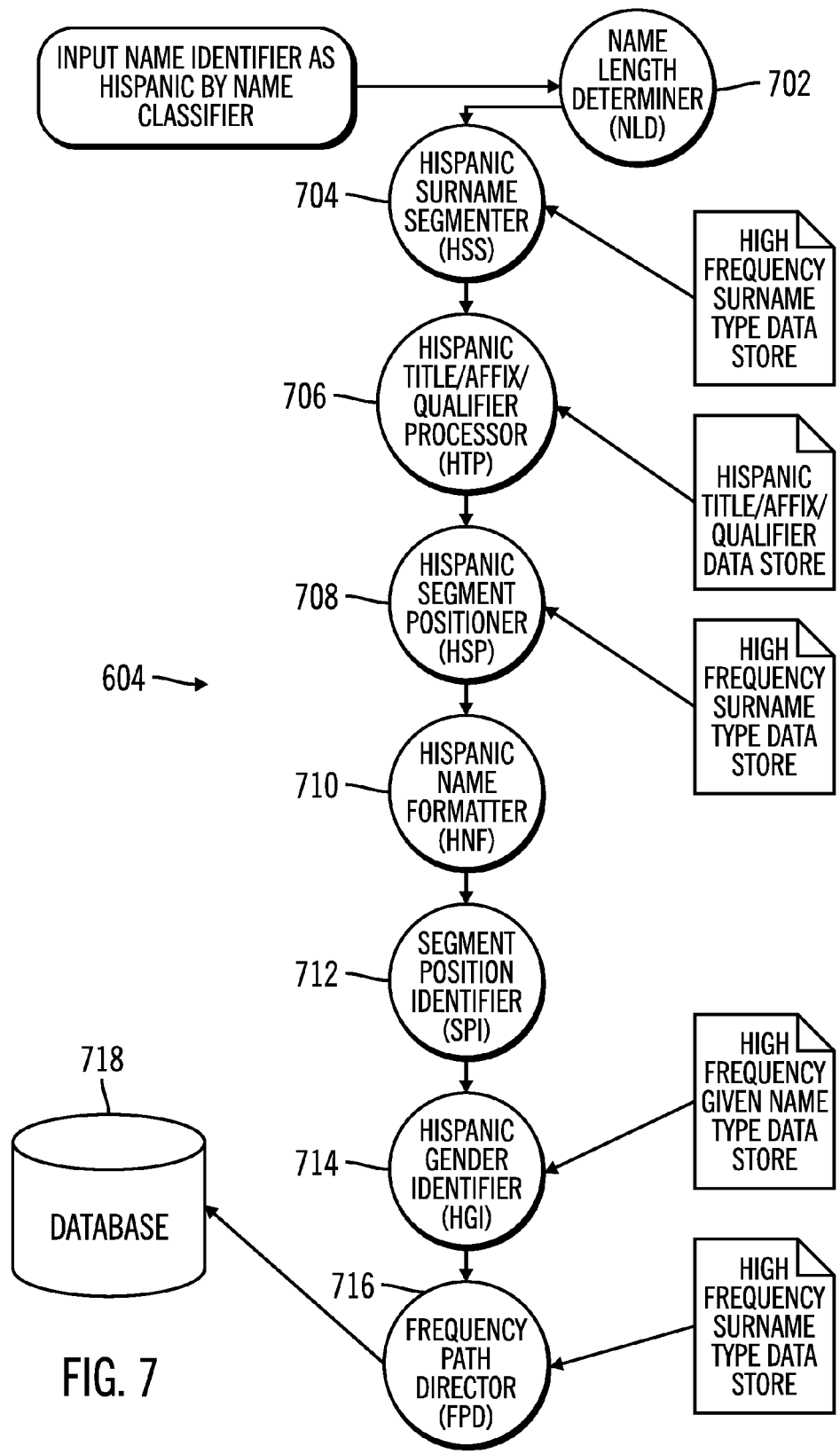
FIG. 7 is a flowchart showing an Hispanic name preprocessor in the process of FIG. 6 in accordance with certain embodiments.

FIG. 7 is an expanded flowchart showing an operational process of the Hispanic name preprocessor, referenced in Block 604 of FIG. 6, in accordance with certain embodiments. The Hispanic name processor prepares a name which has been identified as Hispanic for processing by the Hispanic search engine by identifying name segments and determining their disposition, manipulating the name segments to generate additional query formats, determining name length and record gender, specifying the frequency character of each name segment, and generating search keys.

The process begins with a name length determiner operation on Block 702, which determines the length of the surname. Next, the name is processed by a Hispanic surname segmenter in block 704. This operation divides surnames exceeding a predetermined length (e.g. nine characters) into component segments to compensate for the fact that fixed size data fields often do not accommodate an entire Hispanic surname, leading data entry operators to conjoin name segments in a single field. Then, additional query records are generated for the separated segments and alias records are added for the separated surname segments. This process accesses a high frequency surname type data store to identify surname portions that should be separated. For example, this operation would separate "RAMIREZDELAPAZ" in the surname field into RAMIREZ DELA PAZ and "PEREZDELOPEZ" into PEREZ DE LOPEZ by finding the known surname components DE and DELA.

An Hispanic TAQ processor operates in Block 706 to scan the given name and surname for known titles, affixes, and qualifiers which do not have useful search value. TAQ elements such as DEL, DELA, DE, and SAN are then flagged to be either deleted, disregarded during matching operations, or removed. Delete means that the segment is disregarded for the remainder of the name search process and contributes marginal information to the filter process, but is not actually removed from the record. Disregard means the segment is disregarded in the remainder of the name search process but contributes to evaluation in the filter process. Remove means that a segment conjoined to the name stem is removed from the stem, and then flagged to be either deleted or disregarded as appropriate.

The Hispanic segment positioner in Block 708 operates to move any high frequency surname found in the given name field into the surname field. The name is then formatted by an Hispanic name formatter in Block 710 to generate additional name formats in case the record has more than two surname stems. Next, the name is processed by a segment position identifier in Block 712 to identify the relative position of each of the surname and given name stems. Hispanic names generally contain more than one stem in the given name and surname. In a given name, the leftmost name stem generally indicates gender; in a surname, the leftmost stem is the family name and the other stems are differentiators. Therefore, it is important to identify names that are out of position so that this may be corrected and their relevance appropriately evaluated during the search.

Next, the likely gender of the name is identified by a Hispanic gender identifier in Block 714. The gender identifier attempts to predict gender based on the gender marker of the leftmost given name segment, but may also rely on (or override the apparent gender) based on additional information such as a gender indicated as associated with the search name.

The name is processed by a frequency path director in Block 716 which directs a record for high frequency processing or low frequency processing depending on the presence or absence of high frequency surnames in the input name string.

Figure 8:
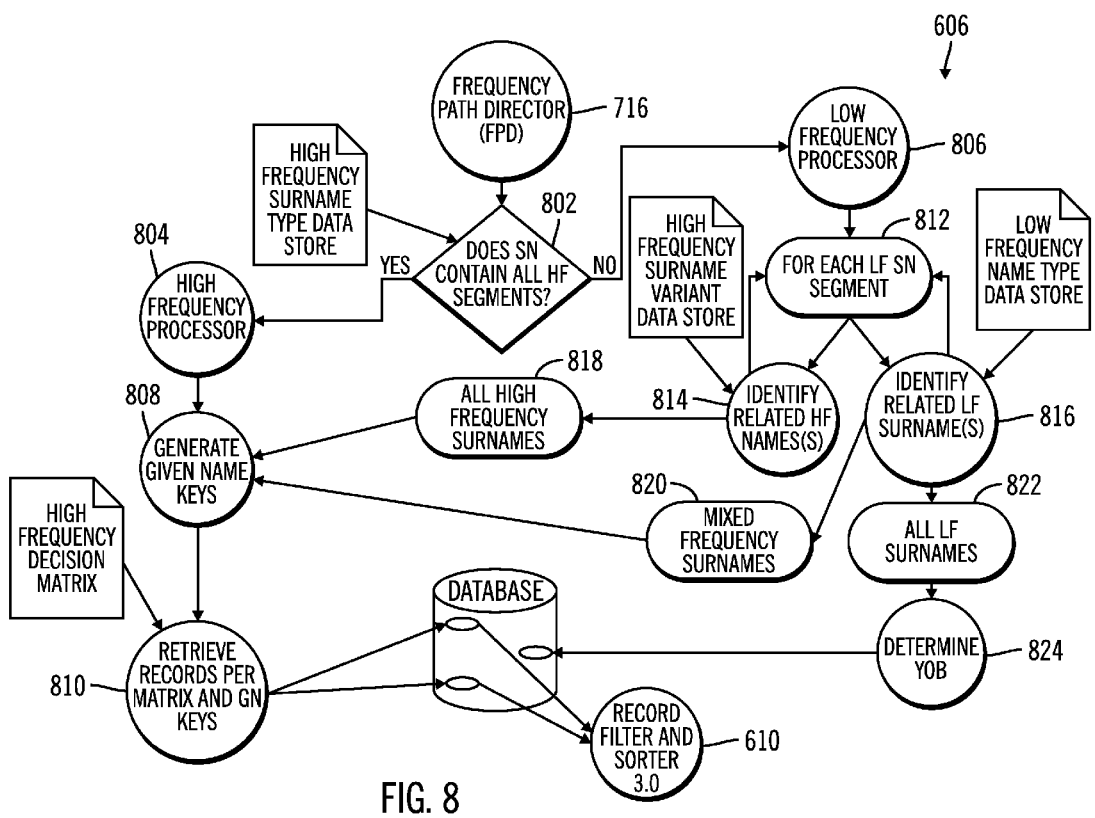
FIG. 8 is a flowchart showing an Hispanic search engine in the process of FIG. 6 in accordance with certain embodiments.

In FIG. 8, the flow of operation of the Hispanic search engine 606 is shown in more detail in accordance with certain embodiments. As described above, the frequency path director operates in block 716 and then determines in block 802 whether the surname contains all high frequency segments. If so, control passes to the high frequency processor in block 804. If not, control passes to the low frequency processor in block 806.

The high frequency processor operation begins in Block 808 with generation of keys for the given names. Then, in block 810, records are retrieved according to a high frequency surname matrix and the given name keys. Control then passes to filter and sorter 610 (shown in FIG. 5).

Low frequency processor operation begins in Block 812 where each low frequency surname segment is examined to identify related high frequency and low frequency surnames, in blocks 814 and 816. This processing loop continues until names related to the segments have been identified. A "relationship" to a high frequency surname is determined by digraph comparison. If the number of identical digraphs exceeds a specified threshold, the surname is deemed to be a mere spelling variant of the similar high frequency surname. If the surnames all relate to known high frequency names, control passes through block 818 to block 808 in the high frequency processor. If the surnames have mixed high and low frequency relationships, control passes through block 820 to block 808. If all surnames have low frequency, control passes through block 822 to block 824. In block 824, a year of birth range is determined for the name. Records are then retrieved based on name content (same or different), position of the name segments, the year of birth range, the record gender, and possibly additional restrictions based on the given name.

Referring again to FIG. 1, the typing and processing of names within the system is preferably informed by cultural information encoded in a name reference library 106. The factors included in name reference library 106 are identified in the database structures shown in Append D, which forms a part of this specification. Appendix E, which also forms a part of this specification, provides additional flowcharts and software descriptions for a preferred embodiment of name classifier module 102 and the Hispanic name search algorithms.

Significantly, as part of name regularization for the purpose of generating an index key for a first pass through the database, the present invention applies the International Phonetic Alphabet to generate index keys, rather than using a Soundex or another conventional key. The IPA algorithm, according to the present invention, generates keys by segmenting (e.g. syllabifying) the name in question and converting it to IPA representation. In this manner, the system generates a key or set of keys which identify a set of pronounced equivalents, rather than generating a key by letter similarity, as in the traditional Soundex method. Significantly, the system generates multiple keys in IPA representation for most names, since most names have multiple possible pronunciations. The system determines multiple possible pronunciations of the name, where applicable, and associates an IPA key with each possible pronunciation. Then, records matching any of the IPA keys for a name are then selected for further consideration and comparison.

To program the IPA conversion, a rule set is generated that relates spelling to sounds. A different rule set is preferably generated for each ethnic origin of name, since pronunciations of apparently similar names may vary significantly based on origin. To generate a rule set, preferably a database of single name elements is obtained, such as a census list. The names in the list may are then manually tagged for their ethnic origin A variety of sources may then be used to determine possible pronunciations. These sources include native speaker knowledge and textual information. The rules are written broadly so that the most plausible pronunciations will be captured with some certainty. Rules for languages not written in roman characters will necessarily take into account transcription variations. The rules are written in a predetermined notation which can be processed effectively by the system. A typical rule format is:

sc/anything_le.fwdarw[sk?]

which is interpreted to mean that the letters sc preceded by anything and followed by the letters le can be pronounced as [s] or [sk], e.g. Muscle and Mosclin. The rules should also be written to account for predictable articulatory processes such as movement of the soft palate, which might lead to a slightly different pronunciation.

As an example of the advantages of matching on IPA, consider a query on the name Lee. Converted to the IPA string [li], exact matches with numerous spelling variants are automatic, including Leigh and Li. Typical prior-art character based matches will fail to retrieve Leigh or Li, since the percentage of character overlap is minimal. Conversely, a standard index matching system such as Soundex will categorize Lee and Li identically, but will still miss Leigh, given the presence of a salient letter (g), and will retrieve a large number of names of low relevance, including Lu, Liao, Low, Louie, Lahoya, and Lehew. The IPA analysis process is further described in Appendix F, which forms a part of this specification.

While the IPA key generation, according to the present invention, provides a significant functional advantage in many cases, it should be noted that it may not be desirable to apply IPA processing to all classes of names. For example, the inventors have found that names of Arabic and Chinese origin are better processed using custom regularization algorithms rather than by the generalized IPA approach, since names acknowledged as similar in these cultures are often quite distinct phonologically.

Following regularization and expansion, name retrieval technology processing module 108 is applied. These algorithms facilitate more complete retrieval, by compensating for transpositions; deleting affixes, where appropriate; and compensating for inverted surnames, deleted surnames and nicknames. Each of these algorithms uses stored information defining naming conventions for a particular culture in the manner described herein.

Next, retrieval module 110 is applied to the results of the preprocessing performed by name classifier 102, variant generation module 104, and retrieval technology module 108. Retrieval module 110 retrieves records matching the keys (IPA or other culture-specific keys) generated by the operation of the first three modules. These records are then provided to precision filter and sorting module 112, which compares each record to the input name to determine a similarity/equivalence measurement defining the "distance" between the input name and the record name. Precision filter and sorting module 112 may perform segment position comparisons, character comparisons, phonological similarity comparisons, structural similarity comparisons, phono-feature-distance comparisons, and/or n-gram comparisons.

The output 114 of precision filter and sorting module 112 is then provided to the user. The output preferably consists of a rank-ordered list of records in descending order of likelihood of matching the input name.

One embodiment implementing many desirable features of the system shown in FIG. 1 is a standalone database search and retrieval program. In addition to including the features described above (and in further detail in the Appendices), this embodiment of the invention may preferably be implemented according to the disclosure in Appendices G, H, I, and J, which form a part of this specification and are: a narrative description, technical plan, acceptance test, and source code listing respectively for a system demonstrating numerous features of the present invention.

Figure 2:
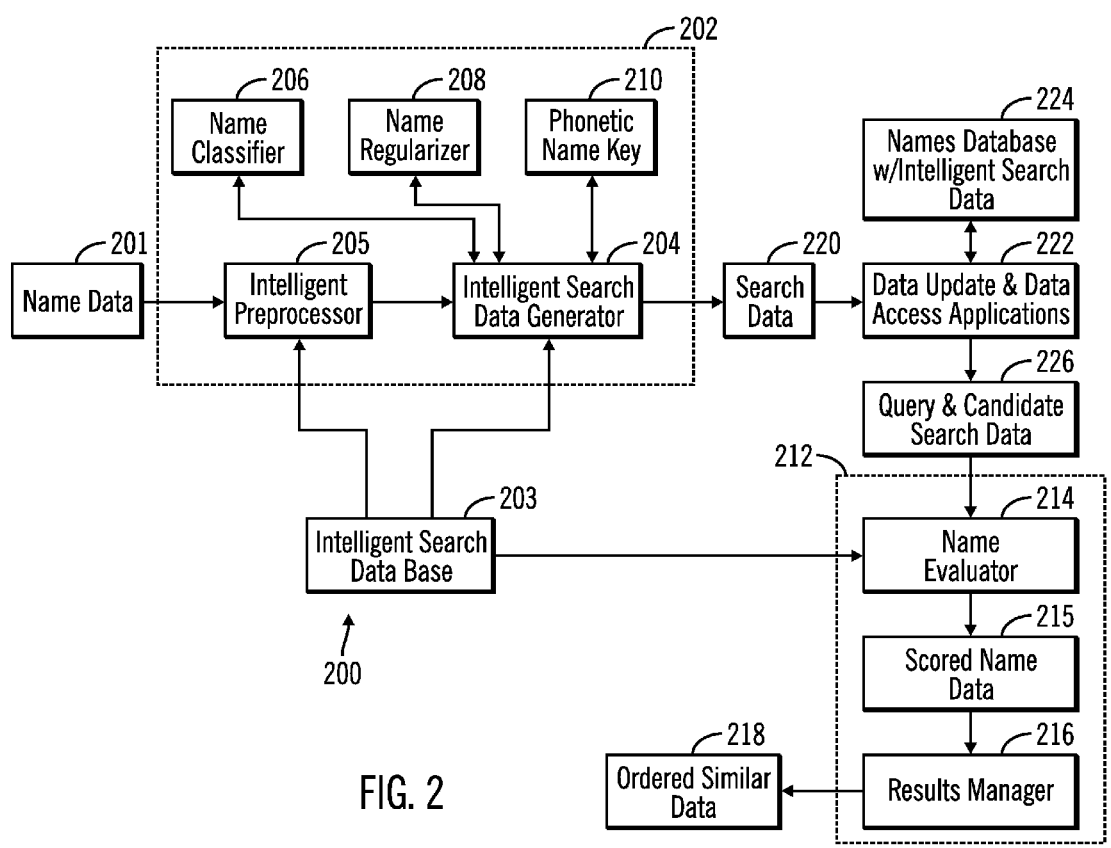
FIG. 2 is a block diagram of the structure of a set of name searching tools which may be provided as one or more Application Programming Interfaces (APIs) for use in developing custom applications in accordance with certain embodiments.

Another desirable embodiment of the invention is as a set of name searching tools which may be provided as one or more Application Programming Interfaces (APIs) for use in developing custom database management and searching applications. A flowchart of an API embodiment is shown in FIG. 2 in accordance with certain embodiments. Further detail of the embodiment of this embodiment is provided in Appendices K (software design description), L (default parameters), M (developer's documentation) and N (source code listing), each of which forms a part of this specification. Operation of elements in the embodiment of FIG. 2 are generally similar to like operational features described with reference to FIG. 1.

As shown in FIG. 2, an API-based name searching system 200 comprises name extraction tools 202 and name comparison tools 212. Name extraction tools 202 comprise Intelligent Search Data Generator (ISDG) 204 and associated intelligent search database 203, intelligent pre-processor 205, name classifier 206, name regularizer 208, and phonetic key generator 210. Name comparison tools 212 comprise name evaluator 214 and results manager 216, with scored name data 215 as an intermediate step. The system receives as an input name data 201, and provides ordered similar data 218 as an output from name comparison tools 212.

The output of ISDG 204 is search data 220, which is provided to data update and data access applications 222 and from there to the name comparison tools 212 as query and candidate search data 226. A names database with intelligent search data 224 is provided in association with data update and data access applications 222.

The embodiment of FIG. 2, like that described previously with reference to FIG. 1, implements a multifaceted approach to multicultural name searching. For example, in the Hispanic culture, an individual typically has a compound family name (e.g., —Arantxa SANCHEZ VICARIO), the first of which (SANCHEZ) provides the more valuable identifying information. In contrast, although Portuguese names also typically have compound family names and look very similar to Hispanic names (e.g., Maria FERREIRA DOS SANTOS), the second family name (DOS SANTOS) provides the more valuable identifying information. If a single solution were proposed where, for example, the Last Name is considered the most important name, as in American names, Hispanic names would not be adequately accommodated.

The disclosed embodiment automatically applies whatever resources will adequately address the problem at hand, whether the variation is cross-cultural or arises from spelling variation, from transcription from other writing systems, from sound similarity, or from missing or additional information.

In operation, the user system supplies both an input name and a database name to the system. The system employs linguistic intelligence to separate the name into its integral components in intelligent preprocessor 205. Further linguistic intelligence is employed to compare the two names in name evaluator 214. The result of the comparison is a scored database name, scored name data 215. The scored name is passed to results manager 216, which collects and orders the names that are scored against a single input name. The final output is an ordered set of scored database names, ordered similar data 218.

The cornerstone of this embodiment is a programming library (functions and classes) that enables a developer to add fuzzy logic personal name searching to an application. For example, the developer may perform operations such as "Give me the 10 closest names to 'James Slesinger' from my database", or "Give me all the names from my database that match 'John Wong' with a degree of confidence of 0.9" or "Tell me the degree of similarity between 'Paul Vanesann' and 'P Vanlesann'". The system incorporates and uses a variety of linguistic techniques to achieve these results, in the manner described previously with respect to a standalone name searching system.

Users can enhance the functionality of the APIs by incorporating their business rules and data into the name comparison process. This embodiment provides fine granularity when comparing names. That is, names are scored and ranked more precisely, which is important when dealing with large volumes of data. The technology incorporates numerous parameters (to customize the user's search comparison).

From the user/developer perspective, the name search system is quite simple to utilize. A typical name search requires the use of just four classes (SNQueryParms, SNQueryNameData, SNEvalNameData, and SNResultsList). In addition, it is important to note that the extra code required to integrate this name search technology is minimal.

The API name search interface is simplified by the fact that it makes no assumptions about the data and how it is stored. The user provides the API with the input name as well as the names from the database as input 201. The library routine then presents names which are likely matches, and qualifies their degree of similarity. From the perspective of the developer, the tool is straightforward and easy to integrate.

Searches via the API embodiment are configurable by adjusting any of 43 parameters (see Appendix L for defaults).

Each parameter controls some aspect of how two names are evaluated when determining if they are similar. Some of the more basic parameters set thresholds for determining how close two names must be to be considered a match. Other parameters control more complex processing, such as how to handle multi-segment names. In general, only a small set of parameters need to be adjusted by the developer, because reasonable defaults exist for each one.

The API embodiment also provides pre-defined packages of parameters, each tailored to a particular culture or ethnicity. For example, Hispanic names have certain characteristics such as compound surnames (e.g., TORRES DE LA CRUZ) that can cause problems when searching for Hispanic names using conventional, Anglo-centric methods. The Hispanic parameters package contains settings that address Hispanic-specific name issues. New cultural/ethnic parameter packages can be established and existing packages can be modified as desired.

Embodiments use a C++ object framework, so that users/developers can extend the existing product functionality to incorporate additional data elements in the scoring algorithm or create evaluation methods specific to their business or application needs. For example, a database might contain a Social Security number, in addition to given name and surname. Although the name search technology only compares name data, a developer can take advantage of class inheritance (a feature of C++), and easily subclass the program's SNEvalNameData and SNQueryNameData objects to include Social Security numbers or any other desired data element(s). These data elements can then be used in the methods that score evaluation names and determine which evaluation names are matches. In other words, record matching can be performed using name data in conjunction with other available data element information.

Users/Developers can also provide custom methods for determining if an evaluation name matches an input name or not. The default method compares the average of the given name score and surname score to a user/developer supplied threshold value. However, a more complex method may be desired. For example, the business rules of an application might dictate that a name cannot be considered a match unless either the surname or given name is an exact match. By overriding the default method, the developer can easily implement this logic in just a few lines of code.

The functions provided in the API embodiment will now be described in more detail. The available functions include comparing an input name with one or more candidate names to produce an ordered list of candidate names with the highest probability of representing the same named person. This functionality is referenced as the name comparison tools 212. The basic name checking tool employs multiple evaluation techniques to evaluate and score two names. The name checking tool incorporates information regarding variations in spelling, discrepancy in the number of name segments (amount of information included), exclusion of expected information, and positional information to establish a name score, which indicates the probability that the two names represent the same individual. The tool is controlled by a set of configurable parameters. The tool also manages and produces an ordered or unordered list of candidate names with the highest probability of representing the same named person, based on the developer defined criteria for establishing a set of results. Various culture specific callable modules are available as extensions to the name check tool, including a name classifier that culturally classifies name data, a name regularizer that levels variations in name data to a single representation, and a phonetic name key that represents name data based on phonetic similarity. Again, each of these tools and modules incorporates the methods and technology described above with reference to FIGS. 1 and 3-8.

The program also generates and stores intelligent search data for use in extracting relevant subsets of data from large data bases for further evaluation. These mechanisms will facilitate more efficient name searching while ensuring complete and accurate results. This functionality is referenced as the Name Extraction Tool(s). The disclosed embodiment provides users/developers with the capability to compare two names to determine the probability that they both represent the same named individual or to compare a single input name with a set of candidate names to determine which candidate names are most likely to represent the same named individual.

When a set of candidate names is evaluated, the APIs enable the user/developer to define the criteria for producing their own ordered list of results. The criteria for defining an ordered list of results include the following: the top X candidate names (i.e., the X candidate names scoring the highest probability that they represent the same named individual; e.g., the top ten candidate names); all candidate names whose name score exceeds a predefined name threshold (e.g., if the threshold=0, all candidate names will be returned in an ordered list); or the top X candidate names whose name score exceeds a pre-defined name threshold.

Name comparison tools 212 include a name evaluator 214, which employs multiple evaluation techniques to evaluate and score two names. Name evaluator 214 incorporates information regarding variations in spelling, inclusion of additional information, exclusion of expected information, and positional information in order to establish a name score, which indicates the probability that the two names represent the same individual. Name evaluator 214 is controlled by a set of configurable parameters. Results manager 216 uses the intermediate scoring information provided by name evaluator 214 to manage and produce an ordered list of candidate names with the highest probability of representing the same named person, based on the developer-defined criteria for establishing the results.

Name extraction tools 202 include an Intelligent Search Data Generator (ISDG) 204 which generates one or more search data values that facilitate extraction of relevant information from a data base for further comparative analysis. This tool is an important component of any search system that must search large volumes of data to locate similar name data, to the extent that it is not feasible to retrieve and evaluate every name record in a data base to determine its relevance to an input name. ISDG 204 provides a motivated method for retrieving all relevant information from a data base while reducing the amount of non-relevant information retrieved. This tool can provide significant performance improvements while also ensuring an accurate and complete name search. Various culture-specific tools are available as extensions to ISDG 204 to address specific issues such as the cultural classification of name data, performed by name classifier 206; leveling of variations in name data to a single representation, performed by name regularizer 208; and the representation of name data based on phonetic similarity, performed by phonetic key generator 210.

Thus, there has been disclosed an improved system and method, in multiple embodiments, for searching personal name databases, with maximum simplicity and ease of integration, maximum flexibility, and maximum extensibility.

Identifying Related Names

In one general aspect, a system that identifies related names includes a data store that persistently stores a collection of names. At least one name within the data store is represented both by a native orthographic form (NOF) of the name and by a transliterated form of the native orthographic form of the name. The system includes an input interface that is structured and arranged to receive an input name. A transliteration module is structured and arranged to produce at lease one transliterated form of the input name. An identifier is structured and arranged to identify at least one name from within the data store that relates to the transliterated form of the input name. An output interface presents the at least one name identified from within the data store as being related to the input name.

Embodiments of this aspect may include one or more of the following exemplary features. At least one of the names in the data store may be derived through transliteration of a native orthographic form of the name. In the data store, at least one name is represented by the native orthographic form using a romanized or non-romanized version of the name and by the transliterated form using a romanized or non-romanized version of the name. Where the input name is received in the native orthographic form (for example Cyrillic, Arabic, Chinese, Hangul, Roman, or Greek written forms, or extensions thereof), one or more romanized forms of the input name may be generated from the native orthographic form of the input name received.

At least one of the names in the data store may be derived from the application of culturally-sensitive regularization rules to a transliterated form of the name. The selection of the culturally specific regularization rules may be determined by a cultural value for the name supplied by the user or by the application of an automatic cultural name classifier. The use of regularization rules minimizes differences that may arise from multiple transliterations of a name. In certain embodiments, there are different culture-sensitive regularization rules for each culture or language. For example, a Farsi name may be transliterated Esfahani or Esphahani. A Farsi regularization rule will collapse the two representations of the /f/ sound into a single symbol. As another example, for an Arabic name, the transliterator creates an intermediate transliteration to which certain spelling regularizations subsequently apply, and it is the output of that process which is presented as the final, transliterated form of the name.

The transliteration module may produce multiple transliterated forms of a single input name, many or each of which being used to identify related names from within the data store. At least one of the transliterated forms may be a regularized form derived from the application of culturally specific regularization rules to a transliterated form.

The transliterated form of the input name may be matched against similar forms of names stored in the data store. A score may be assigned to each of the similar forms of names that matches the transliterated form of the input name. Each of the scores may indicate a quality of match between the transliterated form of the input name and the corresponding similar form. If the transliterated form of the input name is roman and the transliterated form of the names stored in the data store is roman, the roman form of the input name is matched against the roman form of names stored in the data store. Conversely, if the transliterated form of the input name is non-roman and the transliterated form of the names stored in the data store is non-roman, the non-roman form of the input name is matched against the non-roman form of names stored in the data store.

Native orthographic forms stored by the data store may be identified as corresponding to transliterated forms of one or more names within the data store determined to match the transliterated form of the input name. The results produced include one or more of the transliterated or native orthographic forms of the names within the data store that are determined to match the transliterated form of the input name.

In another general aspect, the system may dynamically select the transliteration schema to be applied to the input name from among candidate potential transliteration schemas based on various criteria, including, for example: (1) characteristics of the input name such as geographic or linguistic indicators inherent thereto, (2) characteristics of a pool of names against which the input name is matched, and/or (3) data extrinsic to the input name or pool of names which may be useful in identifying geographic or linguistic characteristics of the party from whom the input name is received. As such, a system that identifies related names includes a data store that persistently stores a collection of names. The system includes an input interface that is structured and arranged to receive an input name. A transliteration module is structured and arranged to apply a dynamically selected transliteration schema to produce at least one transliterated form of the input name, where the transliteration schema is dynamically selected by a module from among several transliteration schemas available for application to the input name. An identifier is structured and arranged to identify at least one name from within the data store that relates to the transliterated form of the input name. An output interface presents the at least one name identified from within the data store as being related to the input name.

In addition to those indicated above with respect to the other aspect, embodiments of this aspect may include one or more of the following exemplary features. The module for dynamically selecting the transliteration schema may include a module for determining a characteristic of the input name, and a module for selecting the transliteration schema to be applied to the input name from among several available transliteration schemas based on the determined characteristic of the input name. The determined characteristic of the input name may include a candidate native orthographic form for the input name, which candidate may be determined based on range of Unicode associated with one or more characters of the input name.

Furthermore, independent characteristics may be determined for more than one segment of the input name, where segments of the input name independently correspond to different names within the entire input name. For instance, a first characteristic may be determined for a first segment of the input name and a second characteristic may be determined for a second segment of the input name, with the first and second characteristics differing. In one embodiment, the first characteristic corresponds to a first candidate native orthographic form and the second characteristic corresponds to a second candidate native orthographic form that differs from the first candidate native orthographic form. In each instance, the first and second candidate native orthographic forms may represent native orthographic forms within a single language.

Additionally or alternatively, the module for dynamically selecting the transliteration schema may include a module for determining characteristics of the names within the data store, and a module for selecting the transliteration schema to be applied to the input name from among several available transliteration schemas based on the determined characteristic of the names within the data store. The module for determining characteristics of names within the data store may be structured and arranged to identify one or more particular transliteration forms of native orthographic forms of the stored names that appear frequently relative to other transliteration forms, and the module for selecting the transliteration schema to be applied to the input name may be structured and arranged to select a transliteration schema corresponding to the one or more particular transliteration forms identified.

Yet again additionally or alternatively, the module for dynamically selecting the transliteration module may include a module for receiving extrinsic data related to the native orthographic form of the input name, and a module for selecting the transliteration schema to be applied to the input name from among several available transliteration schemas based on the received extrinsic data. The extrinsic data may include geographic data related to a person from whom the input name is received, such as information derived from a identifying documents presented by the person, such as a passport, a visa, a green card, or a driver's license.

Various native orthographic forms of an input name may be conveniently matched using a single search utility that is capable of transliterating names from several different native orthographic forms to a common domain in which characteristics shared among the names can be identified. Such a search utility may benefit from an ability to accommodate the input of names in their received or native orthographic form, notwithstanding the form of the stored names against which they will be matched. Specifically, because transliteration of a single name from its native orthographic form into another form often properly results in several different candidate names, such a utility allows for the identification of each different candidate name and thus the determination of matches for each different candidate name.

It also may be useful to enable perception of names in their native orthographic form when providing output from such a search utility, notwithstanding the form of those names used to determine whether they match an input name. For instance, enabling perception of matching names in their native orthographic form may enable identification of actual identities who have been previously encountered and who relate to the romanized version of a data store entry. This type of output enables perception of names in the native orthographic form used to present the input name, which may be highly relevant or recognizable to a particular searcher or search application.

Transliteration of input names and stored target data alike may be particularly effective for a search utility capable of identifying and accounting for characteristics of the transliterations performed on the different native orthographic forms. Furthermore, the transliteration schema(s) to be applied to input names by the search tool may be dynamically selected based on: (1) characteristics of the input name such as geographic or linguistic indicators inherent thereto, (2) characteristics of a pool of names against which the input name is matched, and/or (3) data extrinsic to the input name or pool of names which may be useful in identifying geographic or linguistic characteristics of the party from whom the input name is received.

Referring to FIG. 9A, a search tool system 900 capable of identifying versions of a name input in its native orthographic form includes a query interface 910, a name transliteration engine 920, a name matching engine 930, and a network 940 enabling communications there between in accordance with certain embodiments.

Query interface 910, which is also known as an output interface, is configured to receive an input name to be searched from a user and to display the results of the search from the user. Query interface 910 also may include an application programming interface (API) that includes one or more input/output relationships that indicate how versions of the input name may be identified. More particularly, the relationships specified by the API may be used to provide input names and to receive names related to the input names. For example, the API may include a relationship whose inputs are an input name and a name of an encoding scheme of the input name, which represents symbolic values for the characters of the input name. The relationship optionally may take a language and a culture of the input name as inputs. The outputs of the relationship may be one or more names related to the input name. The related names may be identified based on the encoding scheme, the language, or the culture that are provided as inputs to the relationship. If the language and culture are not provided as inputs, they may be automatically identified based on the input name and the encoding scheme that are provided as inputs.

While identifying the related names, one or more encoding schemes for the related names and one or more transliteration standards or schemas to be applied to the input name and the related names may be automatically identified. Alternatively or additionally, query interface 910 may enable the manual selection of the encoding schemes and the transliteration schemas. If no encoding schemes are automatically identified or manually selected, a default encoding scheme may be used.

Query interface 910 may be implemented using a general-purpose computer, a special purpose computer, or a PDA. As such, query interface 910 generally includes one or more input devices, such as a keyboard, mouse, stylus, or microphone, as well as one or more output devices, such as a monitor, touch screen, speakers, or a printer. If query interface 910 is a separable component, as illustrated by FIG. 9A but not required, it may leverage network 940 in communicating with name transliteration engine 920.

Name transliteration engine 920 is configured to receive an input name, typically from query interface 910, and to produce one or more transliterated forms of that input name. In one embodiment, name transliteration engine 920 produces one or more romanized forms of the input name. The name transliteration engine 920 may be configured to romanize names from some or all of the languages capable of being represented by the Unicode encoding scheme. Multiple distinct romanizing schemes may be available for each of the languages that can be represented by the Unicode encoding scheme. For instance, Chinese may be romanized using the Pinyin or Wade-Giles techniques, either or both of which may be employed by name transliteration engine 920 to romanize names that are input in their native orthographic form of Chinese. Transliterated names created by the name transliteration engine 920 are communicated to name matching engine 930.

Name matching engine 930 is configured to identify one or more matching or related names for the transliterated names produced from name transliteration engine 920, and to provide the same for presentation by query interface 910. For example, in embodiments where name transliteration engine 920 produces romanized forms of the input name, name matching engine 930 identifies one or more matching or related names for the romanized names received from name transliteration engine 920. Examples of name matching engine 930 are described in U.S. Pat. No. 6,963,871, having U.S. patent application Ser. No. 09/275,766, filed Mar. 25, 1999, and U.S. Provisional Patent Application No. 60/079, 233, filed Mar. 25, 1998, each disclosure being incorporated by reference in its entirety.

Query interface 910, name transliteration engine 920, and name matching engine 930 optionally may operate on separate computer systems and be connected using network 940. Network 940 typically includes a series of portals interconnected through a coherent system. Examples of network 940 include the Internet, Wide Area Networks (WANs), Local Area Networks (LANs), analog or digital wired and wireless telephone networks (for example a Public Switched Telephone Network (PSTN)), an Integrated Services Digital Network (ISDN), or a Digital Subscriber Line (xDSL)), or any other wired or wireless network. Network 940 may include multiple networks or sub-networks, each of which may include, for example, a wired or wireless data pathway. When network 940 is included, each of the computer systems on which query interface 910, name transliteration engine 920, and name matching engine 930 operate includes a communications interface (not shown) used to send communications through network 940. The communications may include e-mail, audio data, video data, general binary data, or text data. Alternatively, query interface 910, name transliteration engine 920, and name matching engine 930 may be modules operating on a single computer system that effectively communicate over a bus within the single computer system. In such embodiments, the network 940 is the bus over which the modules communicate.

Referring to FIG. 9B, an embodiment of name transliteration engine 920 is described as including transliteration schema selection module 922, characteristics monitors 924 and 926, and extrinsic data collector 928 in accordance with certain embodiments. Transliteration schema selection module 922 is configured to select among available transliteration schemas based on monitored input from each of 924, 926 and 928. Name transliteration engine 920 uses the selected transliteration schema to transliterate an input name received by name transliteration engine 920.

Characteristics monitor 924 monitors for input name characteristics. For instance, where an input name is provided in Unicode, characters within the input name may be evaluated and assigned a numerical Unicode score, and collectively, the Unicode scores for the evaluated characters may be used to predict characteristics (for example geographic or linguistic) of the name input. For example, if the Unicode scores of the characters of the input name indicate that the input name, or parts thereof, is specified in the Cyrillic alphabet, the monitor 924 may indicate that the input name, or the parts thereof, is a Russian name. Such a determination of the language of a name based on the characters used to spell the name may not be correct in all instances, since names of a particular language may be spelled with characters of an alphabet that does not correspond to the particular language. When a correct determination of the geographic or linguistic characteristics of the input name is made, such characteristics may be used by the transliteration schema selection module 922 to identify dynamically one or more transliteration schemas appropriate for the input name, or partial segments thereof (which may or may not be applied to the entire name).

Similarly, monitor 926 may be configured to monitor characteristics of data stored or accessed by name matching engine 930. For instance, monitor 926 may be configured to discern, identify and/or determine disproportionalities among data store data, and to enable selection of transliteration schemas that take advantage of such disproporationalities where appropriate. In one embodiment, a transliteration scheme may be selected for transliterating an input name when the same transliteration scheme is determined by monitor 926 to have been used in transliterating a significant or disproportionate number of names within the data store. Conversely, a transliteration scheme may be avoided, where advantageous based on characteristics of the data stored or accessed by name matching engine 930.

Extrinsic data collector 928 is configured to detect or collect extrinsic data that may impact a selection of transliteration schemas. For instance, in one embodiment, extrinsic data collector 928 includes an interface for collecting data regarding or contained within a traveler's identifying documents, such as a passport of the traveler that includes origin and destination information and countries of visitation, which may be used by transliteration schema selection module 222 as a factor in determining the set of transliteration schemas for languages associated with one or more of those countries.

Transliteration schema selection module 922 uses information produced by monitors 924 and 926 and data collector 928 to select one or more transliteration schemas appropriate to transliterate a name received by name transliteration engine 920. If the produced information does not absolutely identify a single transliteration schema to be applied to the input name, multiple transliteration schemas may be identified and applied to the input name. For example, multiple romanization schemas may be identified for and applied to the input name эфим ъелинский to produce Efim Belinski, Yefim Byelinsky, and Efime Bielinski as possible romanized forms of the input name. In one embodiment, the multiple transliterated forms of the input name are used to identify names related to the input name. One or more names that are related to any one of the multiple transliterated forms may be identified as related to the input name. Alternatively, one or more names that best match one of the multiple transliterated forms may be identified as related to the input name. For example, more names that match the transliterated form Efim Belinski may be identified than names that match the transliterated forms Yefim Byelinsky and Efime Bielinski. Therefore, the names matching Efim Belinski may be identified as related to the input name эфим ъелинский. In addition, the transliteration schema that produced the transliterated form Efim Belinski may be selected as more appropriate for application to future input names than the transliteration schemas that produced the transliterated forms Yefim Byelinsky and Efime Bielinski. Such a selection may be particularly useful when the future input names are of a similar language or culture of the input name to which the multiple transliteration schema were applied originally.

Moreover, the transliteration of the input name using a selected transliteration schema may lead to the identification of an additional transliteration schema to be applied to the input name or future input names. For example, the input name эфим ъелинский may be romanized to produce the transliterated form Efim Belinski, and transliterated names from that are related to the transliterated form Efim Belinski are identified. Characteristics of the related names may indicate that one or more other transliteration schemas that are different from the transliteration schema used to produce the transliterated form Efim Belinski were used to produce the related names. The one or more other transliteration schema may be applied to the input name to produce different transliterated forms for which additional related names may be identified. The different transliterated forms may match the related names more fully or accurately than the originally transliterated form. In addition, the different transliterated forms may be related to additional names that are not related to the originally transliterated form. In one embodiment, only the additional names related to the different transliterated forms may be identified as related to the input name. In another embodiment, both the additional names related to the different transliterated forms and the names related to the originally transliterated form may be identified as related to the input name, particularly when at least one name related to the originally transliterated form is not a name that is related to one of the different transliterated forms, or vice versa.

A module for identifying characteristics of the transliterated name may be used after the initial transliteration, and different transliteration schemas may be selected for application to the input name based on the identified characteristics.

Any number of transliteration schemas may be applied to the input name and the transliterated forms thereof through repeated identification of characteristics of the input name and application of a transliteration schema to the input name that is appropriate for the identified characteristics. For example, a name written in the Cyrillic alphabet may be non-Russian name, even though characteristics module 924 may indicate that the name is a Russian name. A transliteration schema appropriate for non-Russian names written in the Cyrillic alphabet may be identified and used to transliterate either the input name of the transliterated form of the input name once the determination that the input name is not a Russian name is made. As another example, if names that are received by name transliteration engine 920 or that match the received names are predominantly of a single type, a common transliteration schema appropriate for names of the single type may be applied to future input names automatically or by default without further identification of the common transliteration schema as otherwise appropriate for the future input names.

Referring to FIG. 9C, an embodiment of name matching engine 230 is described as including data store 932 and search engine 934 in accordance with certain embodiments. In certain embodiments, the data store 932 is a data base. Data store 932 contains names in various languages, both in their native orthographic form and in their romanized form, as illustrated by FIG. 9D in accordance with certain embodiments. All names with an NOF that is not in the roman writing system are romanized with the name transliteration engine 920, and the romanized forms are stored in the data store 932 along with the NOF. The NOF of each name is romanized in a non-deterministic manner such that the origin of the name may not be determined. All names with an NOF that is in the roman writing system are simply stored in the data store 932.

As shown in FIG. 9D, the romanization of a name corresponds to a transliteration of the native orthographic form into a roman writing system form of the name. Data store records 936a-136c each contain a romanized form of a name and the native orthographic form of the name. There may exist only one native orthographic form for a romanized form of a name. For example, data store 932 only contains one native orthographic form of the romanized name "Efim Belinskiy" that is associated with record 936b. Similarly, there may only be one romanized form for multiple native orthographic forms of names. For example, data store 932 has two records 936a and 936c with a romanized form of "Efim Belinsky." However, records 936a and 936c have different native orthographic forms. Finally, there may exist multiple romanized forms for a single NOF. For example, records 936a and 936b contain two different romanizations of the Cyrillic name "эфим Belinskiy."

Furthermore, parts of a name may have different origins or languages such that different transliteration schemas are appropriate for application to each of the parts. For example, a given name and a family name of a particular name may have different origins such that a first transliteration schema may be appropriate for the given name and a second transliteration schema may be appropriate for the family name. The data store 932 may include records that relate transliterated and native orthographic forms of individual parts of names instead of or in addition to records that apply to full names. In addition, one or more transliteration schemas may be identified for each part of a name received by name transliteration engine 920, and the transliteration schemas may be applied to the corresponding parts of the name. Handling parts of the name separately may result in a relatively large number of possible matches in the data store 932 for names received by name transliteration device 920.

Separate handling of names by the data store 932 and by name transliteration engine 920 may be particularly useful in situations where people use different orthographies of one or more parts of the name in order to avoid detection. For example, a person that normally uses Chinese given and family names may use an English form of a Chinese given name while continuing to use a Chinese Family name in an attempt to avoid detection. The data store 932 and name transliteration engine 920 may not relate the changed name to the actual name of the person when names are handled as monolithic units, but may do so if the parts of the name are handled individually.

With names stored in their romanized form, it is possible to leverage the data store as a common comparison medium that can be used to test whether names match one another. Additionally, with names being maintained in their native orthographic form, it is possible for the matching names to be returned in their original form, providing a means to present examples of literal names processed by the search tool or developers of data store 932. As will be described hereinafter with respect to processes 1000 and 1100, the data store 932 can return one or more entries that match an input with particularity, and it also may be able to return entries that differ from the input as a result of character variations and cultural variations. Character variations may include, for example, typos, noise, concatenations, truncations, and initials. Cultural variations, for example, may include the addition of titles, suffixes, prefixes, qualifiers, and infixes, as well as nicknames, cultural variants, and the presence or absence of certain name-parts.

Search engine 934 is configured to search data store 932 and retrieve the entries from data store 932 that match or otherwise relate to the romanized version of the input name received through query interface 910. Each matching name produced by search engine 934 is assigned a score that is useful in rating the quality of the match. The score derived by the search engine 934 for a transliterated name in the data store represents a composite assessment of numerous cultural and linguistic factors, as well as general noise-cancellation and string-similarity measures that are considered in attempting to account for the absolute differences between the input name and the transliterated name.

The matching entries, along with their scores, then are sent to query interface 910 for presentation. In one embodiment, the name matching engine 930 includes a utility such as NameHunter™ which has access to rules and data capable of identifying and accounting for variations introduced through transliterations of names from various native orthographic forms to romanized forms. (NameHunter is a trademark of International Business Machines Corporation in the United States, other countries, or both).

Figure 10:
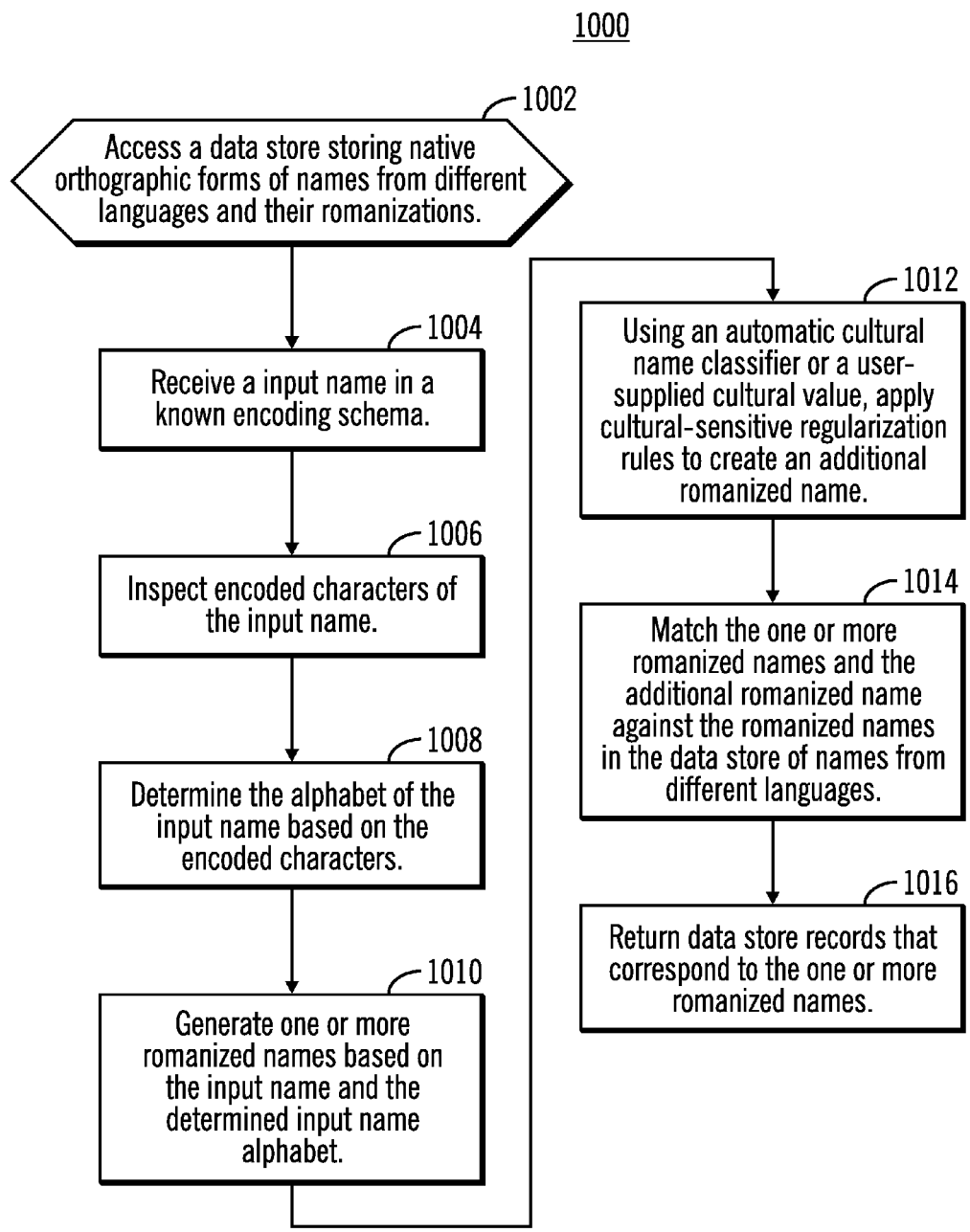
FIGS. 10 and 11 are flow charts illustrating exemplary processes for identifying related names in accordance with certain embodiments.

Referring to the process 1000 of FIG. 10, one or more variations of an input name are identified from within a data store of names in accordance with certain embodiments. A data store of the native orthographic form of names from different languages (that is native orthographic forms) and their romanizations is maintained (1002), and the input name to be searched is received in a known encoding scheme (1004). The names may be referred to as a collection of names that are stored in the data store. The input name can have multiple segments, corresponding to a given, middle, and last name. The encoding scheme of the input name maps characters to numbers, so each character can be said to have a value. Examples of the encoding scheme include the American Standard Code for Information Interchange (ASCII) encoding scheme and the Unicode encoding scheme. The ASCII encoding scheme represents words in the roman writing system, and therefore may require no transliteration to roman. Alternatively, a name may be transliterated within a single writing system, for example, to account for different spellings of the name in the single writing system. The different spellings of the name may correspond to different languages or cultures that use the single writing system. For example, a name may have a different spelling in English and Spanish, even though English and Spanish both use the roman writing system. In such a case, a name may be transliterated from English to Spanish, or vice versa. As another example, characters within names may be rendered differently in different locations, languages, and cultures. For example, the ess-zet character is rendered as "β" in German orthography, which uses the roman alphabet, and as "ss", in other romaniform orthographies. Transliteration within the roman writing system may be used to convert "β" to "ss", and vice versa, thus enabling transliteration to account for different spellings of a name within a single writing system.

Conversely, the Unicode encoding scheme, which subsumes the symbols covered by the ASCII encoding scheme, is capable of representing symbols in various different writing systems including but not limited to the roman writing system. Particularly, the symbols of each writing system tend to be represented using Unicode values within a distinct and identifiable range. Therefore, if an input name is encoded in the Unicode encoding scheme, its corresponding writing system can be determined from the range of Unicode values used to represent the symbols of the name. Names may be transliterated between different writing systems that may be represented by the Unicode encoding scheme. The different writing systems may be used by different languages or cultures, by a single language or culture, or some combination thereof. Other encoding systems include Universal Transfer Format 8 (UTF-8), KOI-8, and KOI-9. A list of encoding systems may be found at http://www.iana.org/assignments/character-sets.

For ease of explanation, the remainder of the FIGS. and 3 processes are described with respect to a Unicode encoding scheme embodiment. Within this embodiment, the symbols of the input name to be searched are inspected (1006). If their corresponding values fall into a range that is characteristic of a particular writing system represented by the Unicode encoding scheme, the input name is determined to have that writing system as its native orthographic form (1008). Otherwise, other processes may be employed to determine an appropriate transliteration scheme to be applied to the input name. This determination is then combined with other linguistic and cultural properties discerned in the name, as well as other extrinsic factors as may be available.

One or more romanized names are generated based on the input name and the writing system of the input name (1010). At least one of the romanized names may be a regularized name derived from the application of culturally specific regularization rules to a transliterated name. One or more romanization techniques are used to create the romanized names from the query input. These romanization techniques convert characters or sets of characters of the origin writing system to characters or sets of characters of the roman writing system. Each romanization technique may romanize the input name in a different way. In addition, each romanization technique may produce multiple romanizations of the input. The romanization process (1010) therefore may and typically does yield a set of romanized forms of the input name to be searched.

Using an automatic cultural name classifier or a user-supplied cultural value, culture-sensitive regularization rules are applied to create an additional romanized name (1012). Romanized names created from the input name are matched against all romanized names in the data store of names from different languages (1014), and the entries in the data store that match the romanized names are identified and returned (1016). Each of the romanized names is independently matched against the names in the data store, and one or more stored and matching names is retrieved for each input romanized name. The returned and matching names are aggregated and returned, and each is scored based on the quality of its match with the input name. Thus names contained within the data store that match the input name are returned.

The task of inspecting the characters of the input name in order to determine its writing system (1006 and 1008) may be optional. The determination of the writing system of the name may be made differently. For example, the writing system of the name can be manually specified when the input name is entered.

As inferred by the description of the FIG. 10 process, the exact romanization techniques employed may be determined dynamically. For instance, in one embodiment, the process 1000 of FIG. 10 may be supplemented or modified to include processes for monitoring characteristics and/or data capable of informing dynamic selection of a transliteration schema, and selection of such a transliteration schema based on the monitored characteristics. Moreover, three factors that can be considered when dynamically choosing a romanization technique include: (1) characteristics of the input name such as geographic or linguistic indicators inherent thereto, (2) characteristics of a pool of names against which the input name is matched, and/or (3) data extrinsic to the input name or pool of names which may be useful in identifying geographic or linguistic characteristics of the party from whom the input name is received.

One influence on the selection of the romanization technique used to transliterate the input name is the characteristics of the input name itself. For example, some Chinese names have elements that reflect Christian influence. These Chinese names are most accurately transliterated to the roman writing system by a specific romanization technique. Detection of the Christian influence in the Chinese name could lead to a dynamic decision to transliterate using the specialized transliteration technique. In general, names corresponding to cultures historically under western influence, such as Hong Kong, often may have attributes indicating the western influence. Transliteration schemas that appropriately account for the western influence may be identified as most appropriate for application to the influenced names.

Second, the information stored in the data store itself can signal which romanization technique will mostly likely yield good matches in the data store. If 80% of the romanized forms of the names in the data store were created with a particular romanization technique, then romanizing the input name with that same technique will probably lead to matches being found in the data store.

Third, the origin of the name can be used as a basis for dynamically selecting which of several available romanization techniques should be used in a particular circumstance. For example, if a certain transliteration technique is always used to romanize the names found in Chinese passports, the romanization technique specifically used in Chinese passports should be employed to transliterate an input name known to have been derived from a Chinese passport. These three factors, in addition to the writing system associated with the NOF, the language(s) and culture(s) in which that writing system is used, and the nature and relative populations of those.

Figure 11:
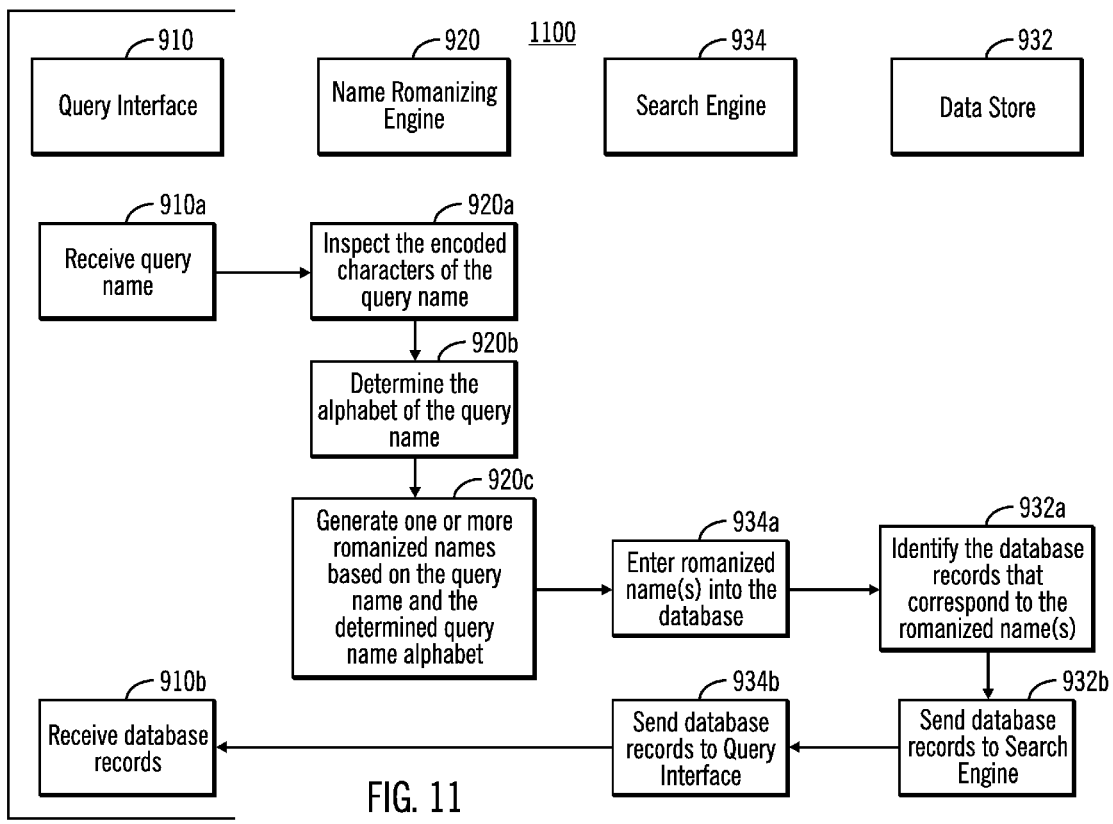
Figure 14:
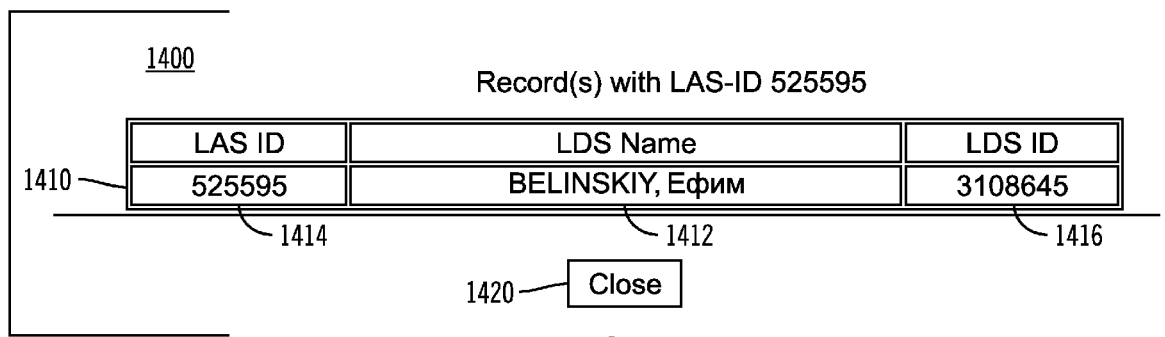

FIG. 11 illustrates a process 1100 that leverages the componentry of FIGS. 9A-9C and interfaces shown by FIGS. 12-14 to identify versions of a name that is input in its native orthographic form from among variations of that name which are derived from other native orthographic forms and stored in a data store in accordance with certain embodiments. In process 1100, query interface 910 receives an input name for which the matching variations are desired (910a). For example, as illustrated in and further described with respect to FIG. 12 in accordance with certain embodiments, a query for the name "efim belinsky" may be received at a user interface 1200.

The query interface 910 passes the input name on to the name transliteration engine 920, which inspects the encoded characters of the input name to determine/identify characteristics of the input name based on its encoding scheme (920a). For example, the encoding scheme may be identified when the name is input, it may be specified beforehand, or otherwise. Based on the characters used in the input name, the name transliteration engine 920 determines the writing system used to create the input name (920b). In the above example, this inspection leads to the conclusion that the name "efim belinsky" is written using the roman writing system, as illustrated in and further described with respect to FIG. 13.

With knowledge of the writing system used to write the input name, name transliteration engine 920 generates one or more romanized names based on the input name and the writing system used to create the input name (20c). The romanized names are generated using a romanization technique that transliterates the input name from its native orthographic form to its romanized forms. In the above example, the name "efim belinsky" does not change as a result of romanization, because it was already in the roman writing system.

Next, the romanized name(s) are automatically entered into the data store 932 by the search engine 934 (934a), generally without requiring specific user input and perhaps without notification to the user. The data store 932 matches the romanized input(s) with its romanized records and identifies data store records accordingly (932a). These records, or the roman or native orthographic form(s) of the name(s) corresponding thereto, are made available to the search engine 934 (932b) and ultimately the query interface 910 (934b). The query interface 910 presents the results (910b) according to user input. In this manner, any records from the data store 932 that matched the romanized name "efim belinsky" will be returned to the query interface 910, in their romanized form and/or their various native orthographic forms. In the above illustration, if "efim belinsky" matched romanized versions of a Chinese native orthographic form, either or both of the romanized or native orthographic form could be presented to the user, as could other results determined to relate to the Chinese matches.

Referring to FIG. 12, an interface 1200 enables a query for names matching a Cyrillic input. The interface 1200 contains text boxes 1210 and 1220 that can be used to specify the input name. The text box 1210 can be used to specify the given name(s), while the text box 1220 can be used to specify the surname(s). The name "эфим" has been entered into the text box 1210 for given names, and the name "ъелинский" has been entered into the text box 1220 for surnames. Selection boxes 1230, 1240, and 1250 allow the user to specify some options for the query. Data store selection box 1230 allows the user to choose which name data store to search. Name type selection box 1240 allows the user to manually specify the culture of the input name in the event that automatic determination is not desired. Alphabets, such as Arabic and Chinese, may be chosen in name type selection box 1240. The "Auto-Classify" option of selection box 1240 signals for automatic determination of the culture of the entered input name.

Search type selection box 1250 allows the user to specify which type of search in the data store to run. Each option in the search type selection box 1250 defines a method or criteria for identifying names that are related to the input name specified in the text boxes 1210 and 1220. In one embodiment, three search types can be chosen from the search type selection box 1250: narrow, medium, and wide. A narrow search applies the most stringent criteria to the matching and ranking process, so that only names that closely resemble the input name in the number, order, and spelling of the name components will qualify as matches. A medium search is slightly more tolerant of differences in spelling, syntax (order), and number of name-components. This search also supports consideration of equivalent names, such as nicknames, for many common given names. A wide search is the most tolerant of differences in spelling, syntax (order), and number of components. This search typically returns the greatest number of matches, some with only a vague resemblance to the input name.

When selected, a "Search" button 1260 submits the query specified by the information entered and selected in the input fields 1210-1250. Clicking the "Search" button 1260 will submit a query of the "Demo Data store August 2003" data store with a default value for the type of search, such as, for example, a narrow search for the name "эфим ъелинский". The culture used in the name "эфим ъелинский" is left for automatic determination.

Referring to FIG. 13, an interface 1300 shows intermediate results of the query in accordance with certain embodiments. Initially, the romanized names are created from the input name "эфим ъелинский" which is written in the Cyrillic writing system. Line 1310a indicates that the romanization of "эфим" from the Cyrillic writing system is "Efim". Likewise, line 1310b says that the romanization of "ъелинский" is "Belinskiy."

These romanized names are then matched against the data store of names, and data store records that match the romanized names are returned. In this case, 4 records 1320a-1320d matching the romanized name "Efim Belinskiy" were returned from the selected data store. For data store record 1320a, the romanized data store name 1322 of the matching record is "BELINSKIY, EFIM." This record matched the input name with a score 1324 of 1 out of 1. Clicking on the hyperlinked record identification number (LAS ID) 1326 creates a second window with further information about the matching record.

Referring to FIG. 14, an interface 1400 contains records of names matching the input name in accordance with certain embodiments. Record 1410 was identified as a match for the input name "эфим ъелинский." The name 1412 in the record is presented in its native orthographic form, which in this case is "BELINSKIY, эфим." This name 1412 is the NOF corresponding to the romanized name 1322 from FIG. 13. In addition, two record identification numbers 1414 and 1416 are displayed as part of the record 1410. Below the list of records is a "Close" button 1420. Clicking on the "Close" button 1420 will close the interface 1400.

The roman writing system is used throughout as the base writing system to which all names are transliterated and in which all comparisons occur. However, any writing system can be used. For example, instead of romanizing the name to be searched, it could be transliterated into the Chinese writing system. Similarly, the data store of names that could contain names in their Chinese forms rather than their roman forms. Thus the terms "romanizing," "romanization," and "roman" can be expanded in meaning to include any writing system.

Personal names have been used throughout of examples of input names that may be transliterated between writing systems such that names from a data store that are related to the input names may be identified. However, names related to any type of name may be identified from the data store, as long as the data store includes the related names. For example, names related to business names may be identified from the data store as long as the data store includes entries relating native orthographic forms of business names to transliterated forms of business names. Business names that are received are transliterated, and the transliterated forms of the business names are matched against the transliterated forms of business names in the data store to identify native orthographic forms of business names that match the received business names.

In certain embodiments for identifying related names, a data store persistently stores a collection of names, at least one name within the data store being represented both by a native orthographic form and by a transliterated form of the native orthographic form of the name; an input interface receives an input name in the native orthographic form; a module determines a characteristic of the input name, wherein the module determines independent characteristics for more than one segment of the input name, where segments of the input name independently correspond to different names within the entire input name, wherein the first module determines a first characteristic for a first segment of the input name and a second characteristic for a second segment of the input name, wherein the first and second characteristics differ, wherein the first characteristic corresponds to a first candidate native orthographic form and the second characteristic corresponds to a second candidate native orthographic form that differs from the first candidate native orthographic form, wherein the first and second candidate native orthographic forms represent native orthographic forms within a single language, wherein the first candidate native orthographic form of the input name is determined based on a range of Unicode associated with one or more characters of the input name; a module determines a characteristic of the stored names within the data store, wherein the module for determining the characteristic of the stored names within the data store identifies one or more particular transliteration forms of native orthographic forms of the stored names that appear frequently relative to other transliteration forms; a module receives extrinsic data related to the native orthographic form of the input name; a module dynamically selects a transliteration schema from among several available transliteration schemas to be applied to the input name based on the determined characteristic of the input name, the determined characteristic of the stored names within the data store, and the extrinsic data, wherein the transliteration schema is used to produce at least one transliterated form of the input name, wherein the module for selecting the transliteration schema to be applied to the input name selects the transliteration schema corresponding to the one or more particular transliteration forms identified; a transliteration module produces the at least one transliterated form of the input name using the selected transliteration schema, wherein the transliteration module generates one or more romanized forms of the input name from the native orthographic form of the input name and applies culture-sensitive regularization rules to create an additional romanized name; a name matching module identifies at least one name from within the data store that relates to the transliterated form of the input name, wherein the name matching module matches the transliterated form of the input name against the similar forms of names stored in the data store, wherein the name matching module assigns a score to each of the similar forms of stored names that matches the transliterated form of the input name, each of the scores indicating a quality of match between the transliterated form of the input name and the corresponding similar form; and an output interface to display to a user the at least one name identified from within the data store as being related to the input name, wherein the output interface produces the native orthographic form of the stored names identified as corresponding to the transliterated forms of the stored names that are determined to match the transliterated form of the input name.

In certain embodiments, at least one of the names in the data store is derived through transliteration of a native orthographic form of the name. In certain embodiments, at least one name maintained by the data store is represented by the native orthographic form using a non-romanized version of the name and by the transliterated form using a romanized version of the name. In certain embodiments, at least one name maintained by the data store is represented by the native orthographic form using a non-romanized version of the name and by the transliterated form using a non-romanized version of the name. In certain embodiments, at least one name maintained by the data store is represented by the native orthographic form using a romanized version of the name and by the transliterated form using a romanized version of the name. In certain embodiments, at least one name maintained by the data store is represented by the native orthographic form using a romanized version of the name and by the transliterated form using a non-romanized version of the name.

In certain embodiments, the transliteration module identifies a romanized version of a name that is input in a Cyrillic written form. In certain embodiments, the transliteration module identifies a romanized version of a name that is input in an Arabic written form. In certain embodiments, the transliteration identifies a romanized version of a name that is input in an extension of the Arabic written form, such as a Farsi written form. In certain embodiments, the transliteration module identifies a romanized version of a name that is input in a Chinese written form. In certain embodiments, the transliteration module identifies a romanized version of a name that is input in a Hangul written form. In certain embodiments, the transliteration module identifies a romanized version of a name that is input in a Roman written form. In certain embodiments, the transliteration module identifies a romanized version of a name that is input in a Greek written form.

In certain embodiments, the transliteration module produces multiple transliterated forms of a single input name, and the name matching module identifies names from within the data store that relate to more than one of the transliterated forms produced by the transliteration module for the single input name. In certain embodiments, the transliterated form of the input name is roman, and the transliterated form of the names stored in the data store is roman, such that the roman form of the input name is matched against the roman form of names stored in the data store.

In certain embodiments, the transliterated form of the input name is non-roman, and the transliterated form of the names stored in the data store is non-roman, such that the non-roman form of the input name is matched against the non-roman form of names stored in the data store. In certain embodiments, the name matching module identifies native orthographic forms stored by the data store that correspond to transliterated forms of one or more names within the data store determined to match the transliterated form of the input name. In certain embodiments, the output interface produces the transliterated forms of the names within the data store that are determined to match the transliterated form of the input name. In certain embodiments, the output interface also produces the transliterated forms of the names within the data store that are determined to match the transliterated form of the input name.

In certain embodiments, the extrinsic data includes geographic data related to a person from whom the input name is received. In certain embodiments, the extrinsic data is derived from identifying documents presented by the person.

In certain embodiments, the data store comprises names corresponding to one or more languages, cultures, and coding schemes.

In certain embodiments for identifying related names, a data store persistently stores a collection of names formatted according to a first writing system; an input interface receives an input name formatted according to a second writing system that differs from the first writing system, wherein at least one name within the data store is derived from transliteration of the input name according to the second writing system, and wherein the data store stores the input name in the second writing system from which it was transliterated and in the first writing system; a module determines the characteristic of the input name, wherein the module determines independent characteristics for more than one segment of the input name, where segments of the input name independently correspond to different names within the entire input name, wherein the module determines a first characteristic for a first segment of the input name and a second characteristic for a second segment of the input name, wherein the first and second characteristics differ, and wherein the first characteristic corresponds to a first candidate native orthographic form and the second characteristic corresponds to a second candidate native orthographic form that differs from the first candidate native orthographic form, wherein the first candidate native orthographic form of the input name is determined based on a range of Unicode associated with one or more characters of the input name; a module determines the characteristic of the names within the data store, wherein the module for determining the characteristics of the names within the data store identifies one or more particular transliteration forms of native orthographic forms of the stored names that appear frequently relative to other transliteration forms; a module receives extrinsic data related to the native orthographic form of the input name; a module dynamically selects a transliteration schema from among several available transliteration schemas to be applied to the input name based on the determined characteristic of the input name, the determined characteristic of the names within the data store, and the extrinsic data, wherein the transliteration schema is used to produce at least one transliterated form of the input name, wherein the module for dynamically selecting the transliteration schema makes an independent determination of a transliteration schema for each of several different segments of the input name, wherein the module for selecting the transliteration schema to be applied to the input name selects a transliteration schema corresponding to the one or more particular transliteration forms identified; a transliteration module applies the selected transliteration schema to produce at least one transliterated form of the input name using the selected transliteration schema, wherein the transliteration module generates one or more romanized forms of the input name from the native orthographic form of the input name and applies culture-sensitive regularization rules to create an additional romanized name; a name matching module identifies at least one transliterated name from within the data store that relates to the transliterated form of the input name; and an output interface displays to a user the at least one stored name identified from within the data store as being related to the input name.

In certain embodiments, the name stored in the data store has a native orthographic form prior to transliteration into the first writing system.

In certain embodiments, the module for dynamically selecting the transliteration schema selects more than one transliteration schema to be applied to the input name by the transliteration module.

In certain embodiments, the first and second candidate native orthographic forms represent native orthographic forms within a single language.

In certain embodiments, at least results of the transliteration are stored into the data store.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 15:
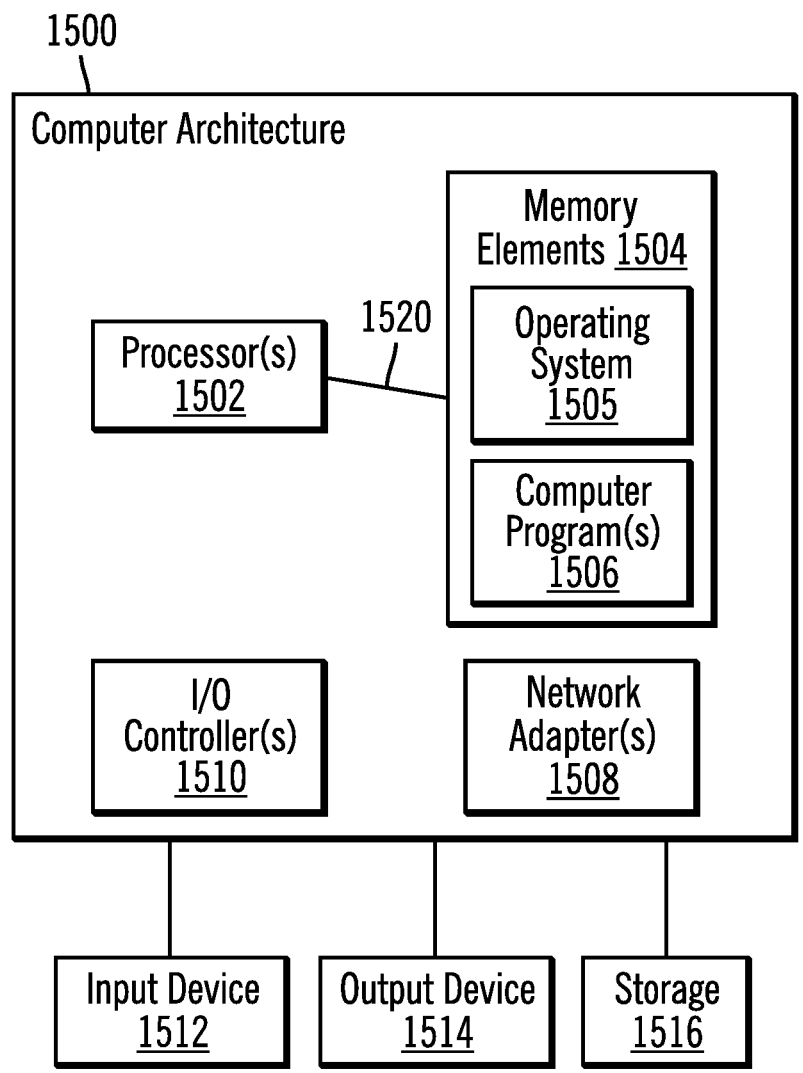
FIG. 15 illustrates a computer architecture that may be used in accordance with certain embodiments.

FIG. 15 illustrates a computer architecture 1500 that may be used in accordance with certain embodiments. The multi-algorithmic name search system 100 and/or the search tool system 900 may implement computer architecture 1500. The computer architecture 1500 is suitable for storing and/or executing program code and includes at least one processor 1502 coupled directly or indirectly to memory elements 1504 through a system bus 1520. The memory elements 1504 may include local memory employed during actual execution of the program code, bulk storage, and cache memories which provide temporary storage of at least some program code in order to reduce the number of times code must be retrieved from bulk storage during execution. The memory elements 1504 include an operating system 1505 and one or more computer programs 1506.

Input/Output (I/O) devices 1512, 1514 (including but not limited to keyboards, displays, pointing devices, etc.) may be coupled to the system either directly or through intervening I/O controllers 1510.

Network adapters 1508 may also be coupled to the system to enable the data processing system to become coupled to other data processing systems or remote printers or storage devices through intervening private or public networks. Modems, cable modem and Ethernet cards are just a few of the currently available types of network adapters 1508.

The computer architecture 1500 may be coupled to storage 1516 (e.g., a non-volatile storage area, such as magnetic disk drives, optical disk drives, a tape drive, etc.). The storage 1516 may comprise an internal storage device or an attached or network accessible storage. Computer programs 1506 in storage 1516 may be loaded into the memory elements 1504 and executed by a processor 1502 in a manner known in the art.

The computer architecture 1500 may include fewer components than illustrated, additional components not illustrated herein, or some combination of the components illustrated and additional components. The computer architecture 1500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible embodiments of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for identifying related names, comprising:
    storing, using a processor of a computer, a collection of names from different languages, wherein each of the names has a native orthographic form and a romanized form;
    receiving an input name in a known encoding scheme;
    determining an alphabet of the input name based on the known encoding scheme;
    generating romanized names based on the input name and the determined alphabet using multiple transliteration schemas;
    identifying a culture associated with the input name;
    selecting one or more culture-sensitive regularization rules for the identified culture, wherein there are different culture-sensitive regularization rules for different cultures;
    applying the selected one or more culture-sensitive regularization rules to one of the romanized names to create an additional romanized name;
    matching the romanized names and the additional romanized name against the romanized names in the collection of names from the different languages; and
    returning data store records that have romanized names that match at least one of the romanized names and the additional romanized name.

2. The method of claim 1, wherein the culture-sensitive regularization rules are applied using an automatic cultural name classifier.

3. The method of claim 1, wherein the culture-sensitive regularization rules are applied using a user-supplied cultural value.

4. The method of claim 1, further comprising:
    producing multiple transliterated forms of the input name, wherein at least one of the transliterated forms is a regularized form derived from the application of the culture-sensitive regularization rules to a transliterated form.

5. The method of claim 1, wherein there are different culture-sensitive regularization rules for different languages.

6. The method of claim 1, wherein a culture-sensitive regularization rule collapses two representations of a sound into a single symbol.

7. A computer system for identifying related names, comprising:
    a processor; and
    a storage device connected to the processor, wherein the storage device has stored thereon a program, and wherein the processor is configured to execute instructions of the program to perform operations, wherein the operations comprise:
        storing a collection of names from different languages, wherein each of the names has a native orthographic form and a romanized form;
        receiving an input name in a known encoding scheme;
        determining an alphabet of the input name based on the known encoding scheme;
        generating romanized names based on the input name and the determined alphabet using multiple transliteration schemas;
        identifying a culture associated with the input name;
        selecting one or more culture-sensitive regularization rules for the identified culture, wherein there are different culture-sensitive regularization rules for different cultures;
        applying the selected one or more culture-sensitive regularization rules to one of the romanized names to create an additional romanized name;
        matching the romanized names and the additional romanized name against the romanized names in the collection of names from the different languages; and
        returning data store records that have romanized names that match at least one of the romanized names and the additional romanized name.

8. The computer system of claim 7, wherein the culture-sensitive regularization rules are applied using an automatic cultural name classifier.

9. The computer system of claim 7, wherein the culture-sensitive regularization rules are applied using a user-supplied cultural value.

10. The computer system of claim 7, wherein the operations further comprise:
    producing multiple transliterated forms of the input name, wherein at least one of the transliterated forms is a regularized form derived from the application of the culture-sensitive regularization rules to a transliterated form.

11. The computer system of claim 7, wherein there are different culture-sensitive regularization rules for different languages.

12. The computer system of claim 7, wherein a culture-sensitive regularization rule collapses two representations of a sound into a single symbol.

13. A computer program product for identifying related names, the computer program product comprising:
    a non-transitory computer readable storage medium having computer readable program code embodied therewith, wherein the computer readable program code, when executed by a processor of a computer, is configured to perform:

storing a collection of names from different languages, wherein each of the names has a native orthographic form and a romanized form;

receiving an input name in a known encoding scheme;

determining an alphabet of the input name based on the known encoding scheme;

generating romanized names based on the input name and the determined alphabet using multiple transliteration schemas;

identifying a culture associated with the input name;

selecting one or more culture-sensitive regularization rules for the identified culture, wherein there are different culture-sensitive regularization rules for different cultures;

applying the selected one or more culture-sensitive regularization rules to one of the romanized names to create an additional romanized name;

matching the romanized names and the additional romanized name against the romanized names in the collection of names from the different languages; and returning data store records that have romanized names that match at least one of the romanized names and the additional romanized name.

14. The computer program product of claim 13, wherein the culture-sensitive regularization rules are applied using an automatic cultural name classifier.

15. The computer program product of claim 13, wherein the culture-sensitive regularization rules are applied using a user-supplied cultural value.

16. The computer program product of claim 13, wherein the computer readable program code, when executed by the processor of the computer, is configured to perform:

producing multiple transliterated forms of the input name, wherein at least one of the transliterated forms is a regularized form derived from the application of the culture-sensitive regularization rules to a transliterated form.

17. The computer program product of claim 13, wherein there are different culture-sensitive regularization rules for different languages.

18. The computer program product of claim 13, wherein a culture-sensitive regularization rule collapses two representations of a sound into a single symbol.

\* \* \* \* \*